United States Patent

Suwa et al.

(10) Patent No.: US 9,400,323 B2
(45) Date of Patent: Jul. 26, 2016

(54) PASSIVE RADAR DEVICE

(75) Inventors: Kei Suwa, Tokyo (JP); Tadashi Oshima, Tokyo (JP); Shohei Nakamura, Tokyo (JP); Toshio Wakayama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 339 days.

(21) Appl. No.: 13/984,936

(22) PCT Filed: Feb. 18, 2011

(86) PCT No.: PCT/JP2011/053500
§ 371 (c)(1),
(2), (4) Date: Aug. 12, 2013

(87) PCT Pub. No.: WO2012/111141
PCT Pub. Date: Aug. 23, 2012

(65) Prior Publication Data
US 2013/0321199 A1 Dec. 5, 2013

(51) Int. Cl.
*G01S 13/04* (2006.01)
*G01S 7/285* (2006.01)
(Continued)

(52) U.S. Cl.
CPC .................. *G01S 7/285* (2013.01); *G01S 13/46* (2013.01); *G01S 13/5244* (2013.01); *G01S 13/5246* (2013.01); *G01S 13/878* (2013.01)

(58) Field of Classification Search
CPC ....... G01S 7/285; G01S 13/003; G01S 13/46; G01S 13/5244; G01S 13/5246
USPC .......................... 342/139, 140, 196
See application file for complete search history.

(56) References Cited

U.S. PATENT DOCUMENTS 5,250,952 A * 10/1993 Roth .................. G01S 13/9035
342/25 F
2004/0233105 A1* 11/2004 Benner ................ G01S 7/4004
342/451
(Continued)

FOREIGN PATENT DOCUMENTS

JP 8-179037 7/1996
JP 2000-147113 5/2000
(Continued)

OTHER PUBLICATIONS

Kulpa, K.S.; Misiurewicz, J., "Stretch Processing for Long Integration Time Passive Covert Radar," Radar, 2006. CIE '06. International Conference on, vol., No., pp. 1,4, Oct. 16-19, 2006.*
(Continued)

*Primary Examiner* — John B Sotomayor
*Assistant Examiner* — Marcus Windrich
(74) *Attorney, Agent, or Firm* — Oblon, McClelland, Maier & Neustadt, L.L.P

(57) ABSTRACT

A passive radar device includes: a pulse-by-pulse range compression unit executing cross-correlation processing between received signals of a direct wave and scattered wave on each of pulses divided by a direct-wave reception unit and a scattered-wave reception unit, and calculating a pulse-by-pulse range profile; a block-by-block Doppler processing unit calculating a first Doppler frequency spectrum by executing pulse-direction Fourier transform in block units each grouping plural pulses; a Doppler frequency cell-associated range migration compensation unit compensating a range-direction movement amount with respect to the first Doppler frequency spectrum on a Doppler-frequency-cell-by-Doppler-frequency-cell basis and on a block-by-block basis; and a block-direction Doppler processing unit calculating a second Doppler frequency spectrum by executing block-direction Fourier transform on an output from the Doppler frequency cell-associated range migration compensation unit.

15 Claims, 12 Drawing Sheets

(51) Int. Cl.
*G01S 13/46* (2006.01)
*G01S 13/524* (2006.01)
*G01S 13/87* (2006.01)

(56) References Cited

U.S. PATENT DOCUMENTS

| | | | | |
|---|---|---|---|---|
| 2004/0257270 | A1* | 12/2004 | Poullin | G01S 7/414 342/159 |
| 2005/0285787 | A1* | 12/2005 | Delaveau | G01S 13/003 342/387 |
| 2010/0097266 | A1* | 4/2010 | Johnson | G01S 7/285 342/195 |

FOREIGN PATENT DOCUMENTS

| | | |
|---|---|---|
| JP | 2006-258786 | 9/2006 |
| JP | 2009-270827 | 11/2009 |

OTHER PUBLICATIONS

Suwa, K.; Nakamura, S.; Morita, S.; Wakayama, T.; Maniwa, H.; Oshima, T.; Maekawa, R.; Matsuda, S.; Tachihara, T., "ISAR imaging of an aircraft target Using ISDB-T digital TV based passive bistatic radar," Geoscience and Remote Sensing Symposium (IGARSS), 2010 IEEE International , vol., No., pp. 4103,4105, Jul. 25-30, 2010.*

Extended European Search Report issued on Jan. 22, 2015 in Application No. 11858756.7.

Kei Suwa, et al., "ISAR Imaging of an Aircraft Target Using ISDB-T Digital TV Based Passive Bistatic Radar", Geoscience and Remote Sensing Symposium (IGARSS), 2010 IEEE International, XP031811646, Jul. 25, 2010, pp. 4103-4105.

Zhang Fenghui, et al., "A New Real Time Range-Doppler Imaging Algorithm", Systems and Control in Aeronautics and Astronautics (ISSCAA), 2010 $3^{rd}$ International Symposium on, IEEE, XP031799688, Jun. 8, 2010, pp. 119-122.

International Search Report issued May 24, 2011 in PCT/JP2011/053500.

Kei Suwa, et al., "Passive ISAR Imaging Using the Digital Terrestrial Television Signals—The Algorithm", Proceedings of the 2010 IEICE General Conference Tsushin 1, Mar. 2, 2010, p. 312.

Kazuhiko Yamamoto, et al., "A New Phase Compensation Algorithm for a Doppler Radar Imaging", The Transactions of the Institute of Electronics, Information and Communication Engineers, Oct. 25, 2000, vol. J83-B, No. 10, pp. 1453-1461.

Nicholas J. Willis, et al., "Advances in Bistatic Radar", SciTech Publishing Inc., 2007, pp. 78-104.

Krzysztof S. Kulpa, et al., "Stretch Processing for Long Integration Time Passive Covert Radar", International Conference on Radar, CIE '06, 2006, 4 pages.

M. Radmard, et al., "Target's Range Migration Compensation in Passive Radar", Proceedings of the $6^{th}$ European Radar Conferences, 2009, pp. 457-460.

* cited by examiner

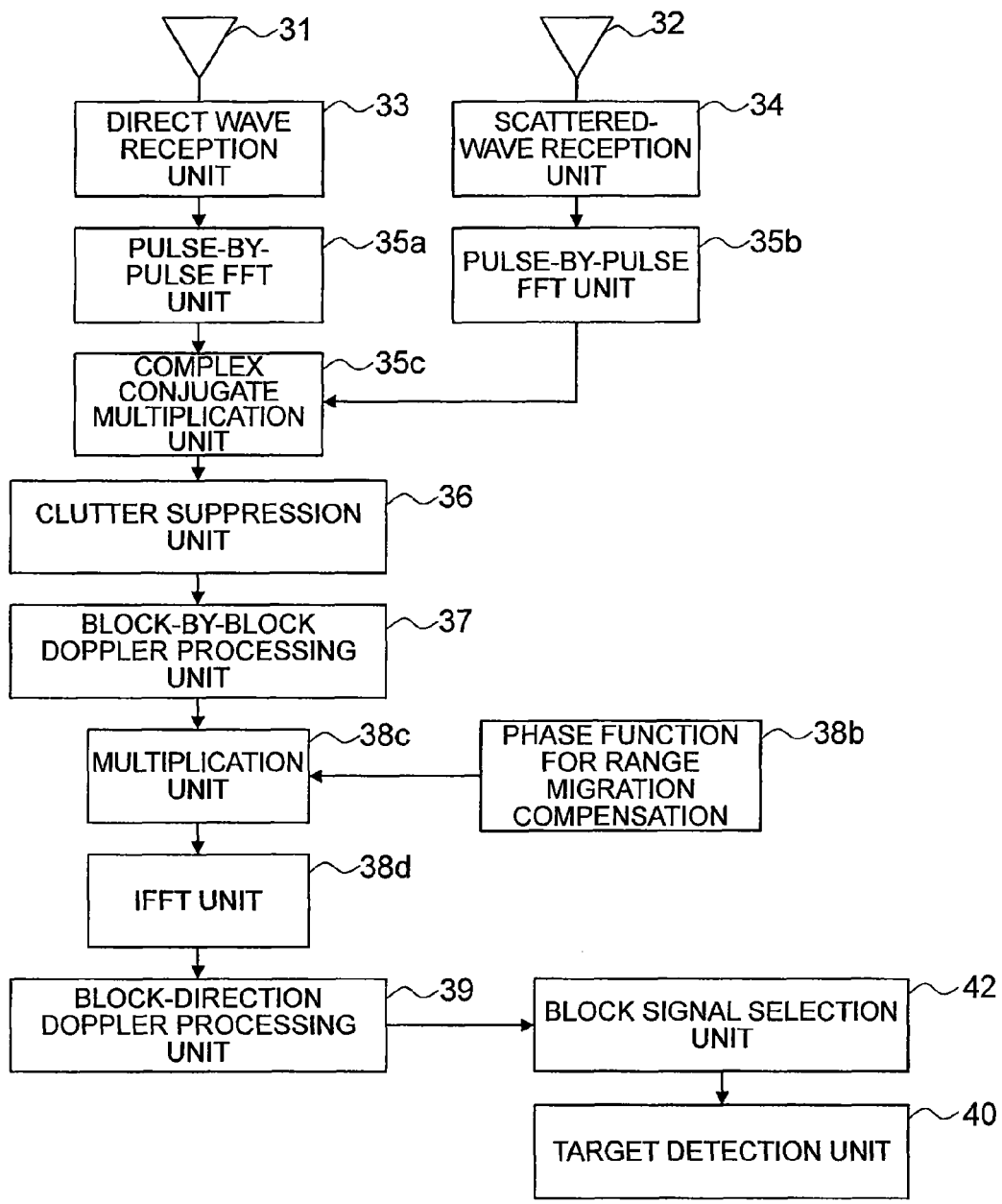

PASSIVE RADAR DEVICE

TECHNICAL FIELD

The present invention relates to a passive radar device that uses a radio wave transmitted from an existing radio source to detect an azimuth of a target, a distance therefrom, and the like based on a signal that directly arrives from the radio source and a signal scattered by the target.

BACKGROUND ART

A passive radar device is a device that uses a radio wave transmitted from an existing radio source such as a broadcasting station to detect an azimuth of a target, a distance therefrom, and the like by measuring a path length difference between a signal (direct wave) that directly arrives from the radio source and a signal (scattered wave) scattered by the target and a Doppler frequency shift of a scattered-wave signal.

Here, examples considered as the radio source include a global navigation satellite system (GNSS) in addition to a television or radio broadcasting station. A passive radar is attracting attention as a system useful for power saving and radio wave resource saving because of not emitting a radio wave itself (see, for example, Non Patent Literature 1).

However, a passive radar system has the most significant object of stretching a detection range. The reason that it is particularly difficult to stretch the detection range with the passive radar system is because power of the radio wave transmitted from the radio source is feeble compared to a detection radar such as a conventional active system, which extremely lowers a signal to noise ratio (SNR). In other words, in the passive radar system, in order to stretch the detection range, it is necessary to improve the SNR.

Therefore, in order to stretch the detection range, which is the most significant object of the passive radar system, there is proposed a method of observing a target for as long a period as possible and extending an integration time of a signal, to thereby increase a Doppler frequency resolution and improve the SNR (see, for example, Patent Literatures 1 to 3). However, by extending the integration time, the target moves between range cells during an observing time, which causes a problem in that there is a change in a distance from a target signal and a Doppler frequency thereof, but Patent Literatures 1 to 3 each disclose a countermeasure against this problem.

Further, in the passive radar system, in order to stretch the detection range, there is proposed a method of applying processing called "stretch processing" to a direct wave signal in order to generate a reference signal into which a movement between the range cells (range migration) corresponding to a speed of the target is incorporated in advance from the direct-wave signal and obtaining a cross-correlation between the reference signal and the scattered-wave signal, to thereby correct the movement between the range cells and extend a time that can be integrated (see, for example, Non Patent Literatures 2 and 3).

CITATION LIST

Patent Literature

[PTL 1] JP 08-179037 A
[PTL 2] JP 2006-258786 A
[PTL 3] JP 2009-270827 A

Non Patent Literature

[NPL 1] N. J. Willis and H. D. Griffiths, "Advances in Bistatic Radar", Scitech publishing Inc., 2007

[NPL 2] K. S. Kulpa, J. Misiurewicz, "Stretch Processing for Long Integration Time Passive Covert Radar", International Conference on Radar, 2006

[NPL 3] M. admard, H. Habibi, M. H. Bastani, F. Behnia, "Target's range migration compensation in passive radar", European Radar Conference, 2009. EuRAD 2009

SUMMARY OF INVENTION

Technical Problems

However, the conventional technologies have the following problems.

In any one of the methods disclosed in Patent Literatures 1 to 3, a target candidate is first detected by using a result of performing Doppler processing for a relatively short integration time, and then a target signal is corrected by using a Doppler frequency of a detected signal. In other words, a target needs to be detected once to some extent within the relatively short integration time. This raises a problem in that an SNR cannot be improved sufficiently.

Further, the methods disclosed in Non Patent Literatures 2 and 3 have a problem in that an increase in calculation amount causes processing load on the device to become heavier.

The present invention has been made in order to solve the problems as described above, and an object thereof is to obtain a passive radar device capable of extending an observing time for a target and an integration time of a signal with a small calculation amount, sufficiently improving an SNR, and stretching a detection range.

Solution to Problems

According to the present invention, there is provided a passive radar device, including: an antenna for direct-wave reception for receiving a direct wave that directly arrives after being transmitted from a radio source; an antenna for scattered-wave reception for receiving a scattered wave transmitted from the radio source and scattered by a target; a direct-wave reception unit for dividing a received signal of the direct wave into pulses; a scattered-wave reception unit for dividing a received signal of the scattered wave into pulses; a pulse-by-pulse range compression unit for executing cross-correlation processing between the received signal of the direct wave and the received signal of the scattered wave on each of the divided pulses and calculating a pulse-by-pulse range profile; a block-by-block Doppler processing unit for calculating a first Doppler frequency spectrum by executing pulse-direction Fourier transform in units of blocks each of which groups a plurality of pulses; a Doppler frequency cell-associated range migration compensation unit for compensating a range-direction movement amount with respect to the first Doppler frequency spectrum on a Doppler-frequency-cell-by-Doppler-frequency-cell basis and on a block-by-block basis; and a block-direction Doppler processing unit for calculating a second Doppler frequency spectrum by executing block-direction Fourier transform on an output from the Doppler frequency cell-associated range migration compensation unit.

Advantageous Effects of Invention

The passive radar device according to the present invention includes: the pulse-by-pulse range compression unit for executing the cross-correlation processing between the received signal of the direct wave and the received signal of the scattered wave on each of the pulses divided by the direct-wave reception unit and the scattered-wave reception unit and calculating the pulse-by-pulse range profile; the block-by-block Doppler processing unit for calculating the first Doppler frequency spectrum by executing the pulse-direction Fourier transform in units of blocks each of which groups the plurality of pulses; the Doppler frequency cell-associated range migration compensation unit for compensating the range-direction movement amount with respect to the first Doppler frequency spectrum on a Doppler-frequency-cell-by-Doppler-frequency-cell basis and on a block-by-block basis; and the block-direction Doppler processing unit for calculating the second Doppler frequency spectrum by executing the block-direction Fourier transform on the output from the Doppler frequency cell-associated range migration compensation unit.

In other words, based on the premise that the Doppler frequency of the target is constant, the problem is simplified so as to limit a movement of the target signal to a linear movement in a range direction. Further, by dividing data that has been observed for a long period into short pulses, long-period correlation processing between a direct wave and a scattered wave is formed by FFT, and processing in units of blocks each of which groups a plurality of pulses is introduced, to thereby speed up handling of range migration during the observing time.

Therefore, it is possible to obtain the passive radar device capable of extending the observing time for the target and the integration time of the signal with a small calculation amount, sufficiently improving the SNR, and stretching the detection range.

BRIEF DESCRIPTION OF DRAWINGS

FIG. 13 is another block diagram illustrating the passive radar device according to the third embodiment of the present invention.

DESCRIPTION OF EMBODIMENTS

Figure 1:
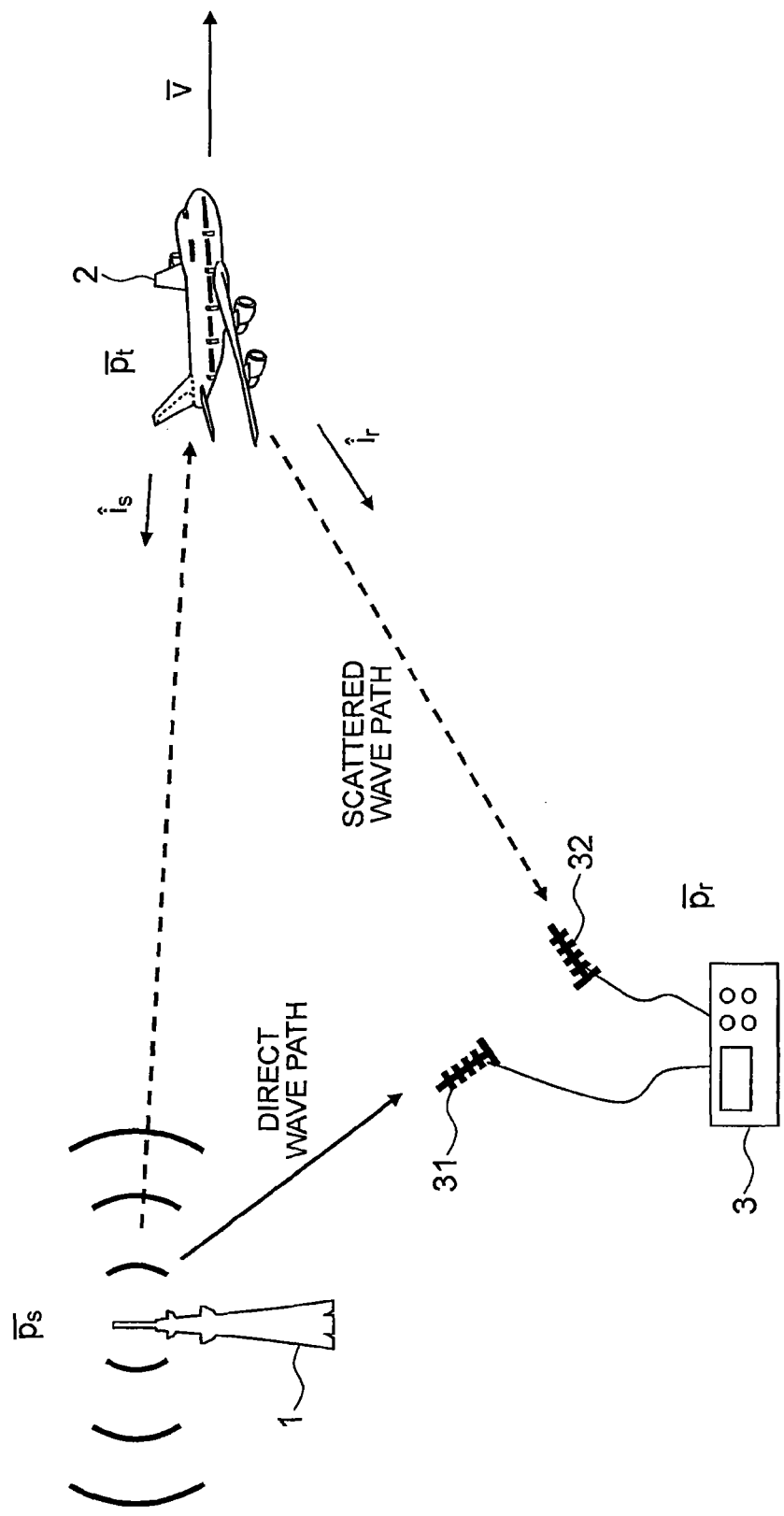
FIG. 1 is an explanatory diagram illustrating a concept of a passive radar along with a geometry of observation.

Referring to the accompanying drawings, a passive radar device according to preferred embodiments of the present invention is described below. In the drawings, the same or corresponding components and parts are denoted by the same reference symbols for description.

Note that, in the respective embodiments of the present invention, for example, a variable "a" above which "→" is added represents a vector, and is described as "a (bar)" in the Description. Further, the variable "a" above which "^" is added represents a unit vector, and is described as "a (hat)" in the Description. Further, the variable "a" above which "~" is added represents an estimated value, and is described as "a (tilde)" in the Description. Further, the variable "a" above which "·" is added represents a rate of temporal change, and is described as "a (dot)" in the Description. Further, the variable "a" above which inverted "˘" is added represents a compensated value, and is described as "a (breve)" in the Description.

First Embodiment

FIG. 1 is an explanatory diagram illustrating a concept of a passive radar along with a geometry of observation. In FIG. 1, a radio wave transmitted from a broadcasting station 1 being a radio source is received by an antenna 31 for direct-wave reception and an antenna 32 for scattered-wave reception that are provided to a receiving station 3.

Here, the antenna 31 for direct-wave reception is disposed so as to be directed toward the broadcasting station 1, and receives a radio wave (direct wave) that directly arrives after being transmitted from the broadcasting station 1. Further, the antenna 32 for scattered-wave reception is disposed so as to be directed toward an observed area in which a target 2 exists, and receives a radio wave (scattered wave) that has been transmitted from the broadcasting station 1 and scattered by the target 2.

It is assumed that the broadcasting station 1 is continuously transmitting (broadcasting) a signal having a carrier frequency $f_c$ and a signal band B. The receiving station 3 amplifies each of signals received through the antenna 31 for direct-wave reception and the antenna 32 for scattered-wave reception, extracts signals having a desired band through a band filter, and then samples the downconverted signals.

Note that, the respective embodiments of the present invention are described on the assumption that the antenna 31 for direct-wave reception and the antenna 32 for scattered-wave reception are antennas different from each other, but the present invention is not limited thereto, and two or more antennas may be used to receive the radio wave transmitted from the broadcasting station 1 and split the radio wave into the direct wave and the scattered wave by digital beam forming.

Further, for an antenna for scattered-wave reception, two antennas for scattered-wave reception having polarization characteristics orthogonal to each other can be used to measure polarization characteristics of scattering caused by a target as well. In this case, by applying each processing described below to signals obtained through the two antennas for scattered-wave reception, it is possible to generate two radar images having polarization characteristics different from each other.

Further, in FIG. 1, $p_s$(bar) and $p_r$(bar) are position vectors indicating fixed positions of the broadcasting station 1 and the receiving station 3, respectively. Further, $p_t$(bar) and v(bar) are vectors indicating a center of gravity and a speed of the target 2, respectively. Further, $i_s$(hat) and $i_r$(hat) are unit vectors indicating directions from the target 2 toward the broadcasting station 1 and the receiving station 3, respectively, and are expressed as the following Expression (1).

[Math. 1]

$$\hat{i}_s = \frac{\overline{p}_s - \overline{p}_t}{\|\overline{p}_s - \overline{p}_t\|}, \hat{i}_r = \frac{\overline{p}_r - \overline{p}_t}{\|\overline{p}_r - \overline{p}_t\|} \quad (1)$$

Further, distances $r_s$ and $r_r$ between the target 2 and the broadcasting station 1 and the receiving station 3, respectively, and a distance $r_d$ between the broadcasting station 1 and the receiving station 3 are defined by the following Expression (2).

[Math. 2]

$$r_s = \|\overline{p}_s - \overline{p}_t\|, r_r = \|\overline{p}_r - \overline{p}_t\|, r_d = \|\overline{p}_r - \overline{p}_s\| \quad (2)$$

It should be noted that the target 2 is moving, and hence $p_t$(bar), v(bar), $i_s$(hat), $i_r$(hat), $r_s$, and $r_r$ are functions of a time instant t, and are explicitly described below as $p_t$(t) (bar) or the like as necessary.

Figure 2:
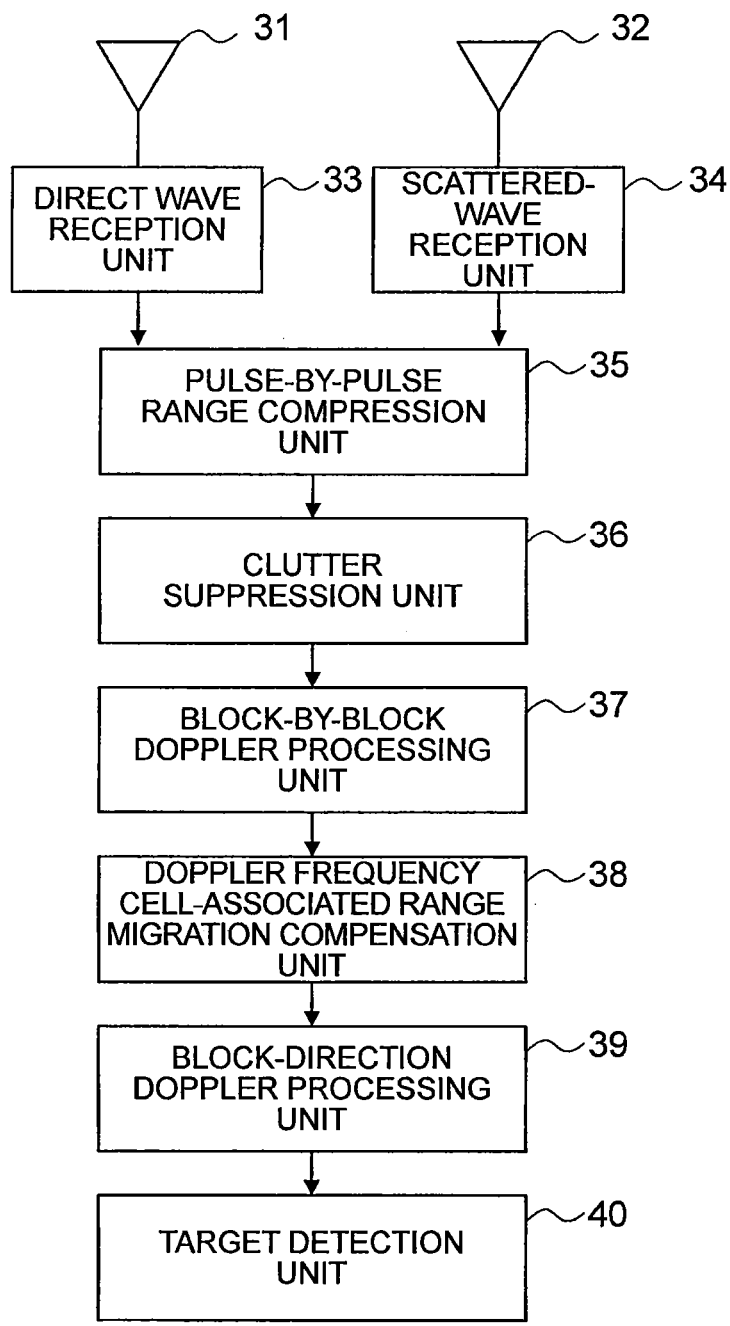
FIG. 2 is a block diagram illustrating a passive radar device according to a first embodiment of the present invention.

FIG. 2 is a block diagram illustrating a passive radar device according to the first embodiment of the present invention. In FIG. 2, the passive radar device includes the antenna 31 for direct-wave reception, the antenna 32 for scattered-wave reception, a direct-wave reception unit 33, a scattered-wave reception unit 34, a pulse-by-pulse range compression unit 35, a clutter suppression unit 36, a block-by-block Doppler processing unit 37, a Doppler frequency cell-associated range migration compensation unit 38, a block-direction Doppler processing unit 39, and a target detection unit 40. Here, at least the direct-wave reception unit 33 and the scattered-wave reception unit 34 are provided to the receiving station 3.

Figure 3:
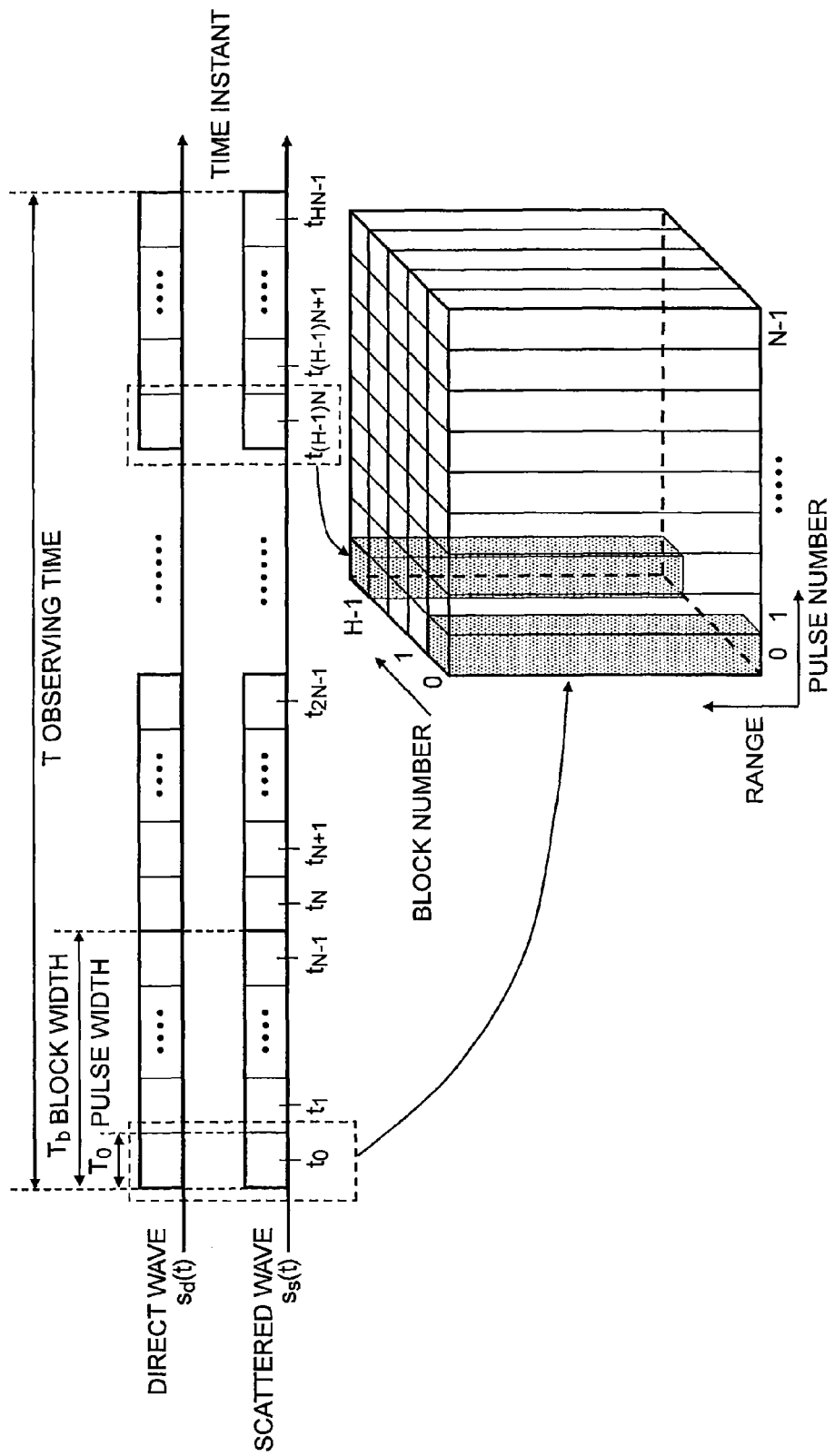
FIG. 3 is an explanatory diagram illustrating handling of a received signal in processing performed by the passive radar device according to the first embodiment of the present invention.

FIG. 3 is an explanatory diagram illustrating handling of a received signal in processing performed by the passive radar device according to the first embodiment of the present invention. In FIG. 3, a horizontal axis thereof represents a time instant. The direct-wave reception unit 33 and the scattered-wave reception unit 34 each receive a signal during an observing time T [sec] illustrated in FIG. 3. Further, the direct-wave reception unit 33 and the scattered-wave reception unit 34 each divide the received signal into H blocks of $T_b$ [sec], and divide each of the blocks into N pulses of $T_0$ [sec].

Herein, in the respective embodiments of the present invention, $T_0$, $T_b$, and T are referred to as "pulse width", "block width", and "observing time", respectively. Further, pulses are adjacent to each other, and hence a repetition interval of the pulse coincides with the pulse width $T_0$. Therefore, the pulse width $T_0$ is sometimes referred to as "pulse repetition interval (PRI)" as necessary. Further, from the above-mentioned definition, $T_0$, $T_b$, and T satisfy a relationship expressed by the following Expression (3).

[Math. 3]

$$T = HT_b$$

$$T_b = NT_0 \quad (3)$$

Note that, in this manner, the received signal is divided into pulses, which are grouped into blocks, in order to realize the speeding up of the processing. Although described later in detail, by dividing data that has been observed for a long time into short pulses, long-period correlation processing between the direct wave and the scattered wave can be all formed by the fast Fourier transform (FFT). Further, by performing the processing in units of blocks each of which groups several pulses, it is possible to speed up handling of range migration during the observing time.

Subsequently, the direct wave received from the broadcasting station 1 and the scattered wave received from the target 2 are formulated in order to describe the operations of the pulse-by-pulse range compression unit 35 and the subsequent processing blocks. Here, a wave transmitted from the broadcasting station 1 is a narrow-band signal having a center frequency of $f_c$, and hence a received signal $s_d$(t) (tilde) of the direct wave received from the broadcasting station 1 in the position of the receiving station 3 is expressed by the following Expression (4).

[Math. 4]

$$\tilde{s}_d(t) = a(t-\tau_d)\exp\{j2\pi f_c(t-\tau_d)\} \quad (4)$$

In Expression (4), a(t) represents a complex amplitude of a transmitted signal, and $\tau_d$ represents a propagation delay time of the direct wave. In the case of the passive radar, the transmitted signal is unknown, and it is appropriate to handle a complex amplitude a(t) as a random process. Further, in the following description, it is assumed that wide-sense stationary (WSS) is established.

On the other hand, the broadcasting station 1 and the receiving station 3 are both assumed to be stationary during the observation, and hence $\tau_d$ is a constant. Further, a received signal $s_{dn}$(t) (tilde) of the direct wave in an n-th pulse (n=0, 1, . . . , HN−1) is none other than what is cut out during $t_n - T_0/2 \le t \le t_n + T_0/2$ of Expression (4) as expressed by the following Expression (5).

[Math. 5]

$$\tilde{s}_{dn}(t) = a(t-\tau_d)\exp\{j2\pi f_c(t-\tau_d)\} \; (t_n - T_0/2 \le t \le t_n + T_0/2) \quad (5)$$

Note that, in the case where the target 2 is moving, the propagation delay time of the scattered wave is an accident, but in a case where the pulse width $T_0$ is sufficiently short, it is conceivable that the propagation delay time during that time can be subjected to first-order approximation. Therefore, assuming that the propagation delay time at a time instant $t_n$ is $\tau_{sn0}$ and a rate of change in the propagation delay time is $\tau_{sn}$(dot), a propagation delay $\tau_{sn}$ of the scattered wave is expressed by the following Expression (6).

[Math. 6]

$$\tau_{sn} = \tau_{sn0} + \dot{\tau}_{sn}(t-t_n) \quad (6)$$

In view of this relationship, a received signal $s_{sn}$(t) (tilde) of the scattered wave in the n-th pulse (n=0, 1, . . . , HN−1) can be approximately expressed as the following Expression (7).

[Math. 7]

$$\tilde{s}_{sn}(t) \approx \alpha a(t - \tau_{sn0})\exp\{j2\pi f_c[t - \tau_{sn0} - \dot{\tau}_{sn}(t - t_n)]\} \quad (7)$$
$$= \alpha a(t - \tau_{sn0})\exp\{j2\pi[f_c(t - \tau_{sn0}) + f_{dn}(t - t_n)]\}$$
$$(t_n - T_0/2 \leq t \leq t_n + T_0/2)$$

However, it is assumed here that the target 2 is formed of one scattering point. Further, in Expression (7), $\alpha$ represents an amplitude ratio due to a difference in attenuation ascribable to a difference in propagation length, and $f_{dn} = -f_c\dot{\tau}_{sn}$ (dot) represents a Doppler frequency at the time instant $t_n$. In addition, in Expression (7), compared to the band of the complex amplitude, the rate of change $\tau_{sn}$(dot) in the propagation delay time is sufficiently small, and hence, with regard to the term of the complex amplitude a(t), it is assumed that the propagation delay time is $\tau_{sn0}$ and constant during the pulse width $T_0$.

Note that, in the geometry of observation illustrated in FIG. 1, time delays $\tau_d$ and $\tau_{sn0}$ of the direct wave and the scattered wave, respectively, and a Doppler frequency $f_{dn}$ of the scattered wave are each obtained as the following Expressions (8) to (10).

[Math. 8]

$$\tau_d = \frac{r_d}{c} \quad (8)$$

[Math. 9]

$$\tau_{sn0} = \frac{1}{c}\{r_s(t_n) + r_r(t_n)\} \quad (9)$$

[Math. 10]

$$f_{dn} = -f_c\dot{\tau}_{sn} \quad (10)$$
$$= -\frac{f_c}{c}\frac{d}{dt}\{r_s(t) + r_r(t)\}\bigg|_{t=t_n}$$
$$= \frac{f_c}{c}\{\hat{i}_s(t_n) + \hat{i}_r(t_n)\}\cdot\overline{v}(t_n)$$
$$= -\frac{1}{2}\{\overline{k}_s(t_n) + \overline{k}_r(t_n)\}\cdot\overline{v}(t_n)$$

In Expressions (8) to (10), c represents a light velocity. Further, in Expression (10), $\overline{k}_s(t)$ (bar) and $\overline{k}_r(t)$ (bar) represent wave number vectors at the time instant t, and are defined by the following Expression (11).

[Math. 11]

$$\overline{k}_s(t) = -\frac{2\pi}{\lambda}\hat{i}_s(t),\ \overline{k}_r(t) = -\frac{2\pi}{\lambda}\hat{i}_r(t)\ \left(\lambda = \frac{c}{f_c}\right) \quad (11)$$

Here, Expression (10) is derived by using a relationship of temporal differentiation of a distance $r_s(t)$ expressed by the following Expression (12). Note that the same applies to the distance $r_r(t)$.

[Math. 12]

$$dr_s(t) = \frac{d}{dt}\|\overline{p}_s(t) - \overline{p}_t(t)\| \quad (12)$$
$$= \frac{\overline{p}_s(t) - \overline{p}_t(t)}{\|\overline{p}_s(t) - \overline{p}_t(t)\|}\cdot\frac{d}{dt}\{\overline{p}_s(t) - \overline{p}_t(t)\}$$
$$= \hat{i}_s(t)\cdot\overline{v}(t)$$

Further, the received signal $s_{dn}(t)$ of the direct wave and the received signal $s_{sn}(t)$ of the scattered wave that are downconverted by using a sinusoidal signal having a local frequency $f_1 = f_c - \Delta f_c$ from Expressions (5) and (7) are expressed by the following Expressions (13) and (14).

[Math. 13]

$$s_{dn}(t) = \tilde{s}_{dn}(t)\exp(-j2\pi f_1 t - j\phi) \quad (13)$$
$$= a(t - \tau_d)\exp\{j2\pi(\Delta f_c t - f_c\tau_d) - j\phi\}$$
$$(t_n - T_0/2 \leq t \leq t_n + T_0/2)$$

[Math. 14]

$$s_{sn}(t) = \tilde{s}_{sn}(t)\exp(-j2\pi f_1 t - j\phi) \quad (14)$$
$$= \alpha a(t - \tau_{sn0})\exp\{j2\pi[\Delta f_c t - f_c\tau_{sn0} + f_{dn}(t - t_n)] - j\phi\}$$
$$= \alpha s_{dn}(t - \tau_n)\exp\{-j2\pi(f_c - \Delta f_c)\tau_n\}\exp\{j2\pi f_{dn}(t - t_n)\}$$
$$(t_n - T_0/2 \leq t \leq t_n + T_0/2)$$

In Expression (14), $\tau_n = \tau_{sn0} - \tau_d$ represents a time delay difference between the direct wave and the scattered wave, and $\phi$ represents an initial phase of a local oscillator. Note that, the last equation of Expression (14) expresses the received signal $s_{sn}(t)$ of the scattered wave by using the received signal $s_{dn}(t)$ of the direct wave.

Subsequently, the pulse-by-pulse range compression unit 35 executes range compression by cross-correlation processing described below on a pulse-by-pulse basis. A cross-correlation function $x_n(\tau)$ of the following Expression (15) obtained by the cross-correlation processing is referred to as "range profile" in the respective embodiments of the present invention. The pulse-by-pulse range compression unit 35 outputs the range profile $x_n(\tau)$ (n=0, 1, . . . , HN−1).

[Math. 15]

$$x_n(\tau) = \int_{t_n - T_0/2 + \tau}^{t_n + T_0/2} s_{sn}(t)\cdot s^*_{dn}(t - \tau)\cdot dt \quad (15)$$

When the above-mentioned Expression (14) is substituted into Expression (15), it is understood that the range profile $x_n(\tau)$ in a case where one scattering point exists as the target 2 is expressed by the following Expression (16).

[Math. 16]

$$x_n(\tau) = \alpha \exp\{-j2\pi(f_c\tau_n - \Delta f_c\tau + f_{dn}t_n)\}\int_{t_n - T_0/2 + \tau}^{t_n + T_0/2} a(t - \tau_{sn0})a^*(t - \tau_d - \tau)\exp(j2\pi f_{dn}t)dt = \alpha \exp\{-j2\pi(f_c\tau_n - \Delta f_c\tau)\}\int_{-T_0/2 + \tau}^{T_0/2} a(t + t_n - \tau_{sn0})a^*(t + t_n - \tau_d - \tau)\exp(j2\pi f_{dn}t)dt \quad (16)$$

In Expression (16), with regard to the complex amplitude a(t), it is assumed that the wide-sense stationary (WSS) is established, and hence an expected value $R_a(t)$ of an auto correlation function is expressed by the following Expression (17).

[Math. 17]

$$R_a(\tau) = E\{a(t)a^*(t-\tau)\} \quad (17)$$

Further, from Expression (17), an expected value $E\{x_n(\tau)\}$ of the range profile $x_n(\tau)$ is expressed by the following Expression (18).

[Math. 18]

$$\begin{aligned} E\{x_n(\tau)\} &= \alpha \exp\{-j2\pi(f_c\tau_n - \Delta f_c\tau)\} \quad (18) \\ &\int_{-T_0/2+\tau}^{T_0/2} R_a(\tau - \tau_n) \exp(j2\pi f_{dn}t) dt \\ &= \alpha(T_0 - \tau) \exp(j\pi f_{dn}\tau) \frac{\sin\{\pi f_{dn}(T_0 - \tau)\}}{\pi f_{dn}(T_0 - \tau)} \times \\ &\quad \exp\{-j2\pi(f_c - \Delta f_c)\tau_n\} R_a(\tau - \tau_n) \exp\{j2\pi\Delta f_c(\tau - \tau_n)\} \\ &= A(\tau) R_a(\tau - \tau_n) \exp\{j2\pi\Delta f_c(\tau - \tau_n)\} \exp\{-j2\pi(f_c - \Delta f)_c \tau_n\} \end{aligned}$$

Note that, in Expression (18), the following Expression (19) is obtained.

[Math. 19]

$$\begin{aligned} A(\tau) &= \alpha(T_0 - \tau) \exp(j\pi f_{dn}\tau) \frac{\sin\{\pi f_{dn}(T_0 - \tau)\}}{\pi f_{dn}(T_0 - \tau)} \quad (19) \\ &\approx \alpha(T_0 - \tau) \quad (f_{dn}\tau < f_{dn}T_0 \ll 1) \end{aligned}$$

In Expression (19), the term of a sinc function is a term indicating a loss of a correlation between the scattered wave and the direct wave which occurs due to the fact that the scattered wave is subjected to a Doppler shift caused by a movement of the target 2, but if the pulse width $T_0$ is short, this loss can be ignored, and an approximation of Expression (19) is established. Further, in Expression (19), from the term of $(T_0-\tau)$, it is understood that the pulse width $T_0$ needs to be sufficiently longer than a conceivable time delay difference.

Here, by shifting operation timings of the direct-wave reception unit 33 and the scattered-wave reception unit 34 to delay a reception timing of the scattered-wave reception unit 34 compared to a reception timing of the direct-wave reception unit 33, it is possible to observe a distance without increasing the pulse width $T_0$. For example, by delaying the reception timing of the scattered-wave reception unit 34 by $\tau_n$, a target signal can be integrated without a loss. At this time, a target position is unknown in actuality, and hence it is desired to give a delay determined by a distance from a center part of the observed area of interest.

Note that, the received signal $s_{dn}(t)$ of the direct wave, the received signal $s_{sn}(t)$ of the scattered wave, the range profile $x_n(\tau)$, and the like have been so far formulated as continuous analog signals, but in terms of implementation, become digital signals discretized by sampling.

As described above, the pulse-by-pulse range compression unit 35 uses the cross-correlation processing expressed by the above-mentioned Expression (15) to calculate and output the range profile. At this time, if the received signal $s_{dn}(t)$ of the direct wave and the received signal $s_{sn}(t)$ of the scattered wave are digital signals, a cross-correlation function calculated by the above-mentioned Expression (15) may be substituted by a circular cross-correlation function obtained by high-speed calculation using the FFT, to thereby speed up the processing.

Figure 4:
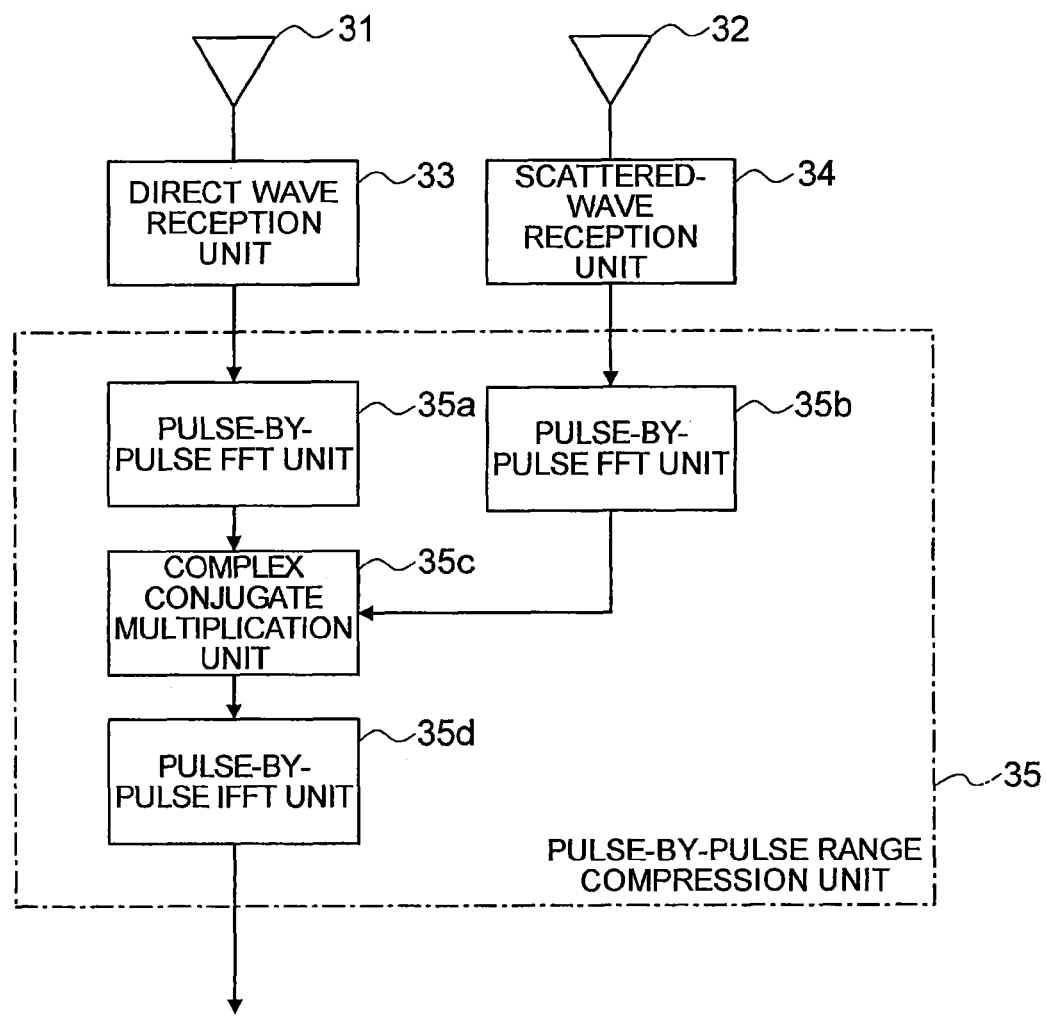
FIG. 4 is a block diagram illustrating a pulse-by-pulse range compression unit of the passive radar device according to the first embodiment of the present invention.

FIG. 4 is a block diagram illustrating a case where the pulse-by-pulse range compression unit 35 is formed of high-speed calculation blocks using the FFT in the passive radar device according to the first embodiment of the present invention. In FIG. 4, the pulse-by-pulse range compression unit 35 includes pulse-by-pulse FFT units 35a and 35b, a complex conjugate multiplication unit 35c, and a pulse-by-pulse IFFT unit 35d.

First, the pulse-by-pulse FFT unit 35a and the pulse-by-pulse FFT unit 35b divide a direct-wave signal and a scattered-wave signal, which are received by the direct-wave reception unit 33 and the scattered-wave reception unit 34, respectively, into pulses having the pulse width $T_0$, and then apply the FFT to each of the pulses.

Subsequently, the complex conjugate multiplication unit 35c executes complex conjugate multiplication processing between corresponding pulses in signals after the FFT of the direct-wave signal and the scattered-wave signal, which are obtained by the pulse-by-pulse FFT units 35a and 35b, respectively. Specifically, the complex conjugate multiplication unit 35c executes processing for multiplying, for each element, a complex conjugate signal of the signal after the FFT of the direct-wave signal by the signal after the FFT of the scattered-wave signal. An output signal from the complex conjugate multiplication unit 35c is output to the pulse-by-pulse IFFT unit 35d.

The pulse-by-pulse IFFT unit 35d applies inverse fast Fourier transform (IFFT) processing to the signal output from the complex conjugate multiplication unit 35c, to thereby calculate and output the circular cross-correlation function. The circular cross-correlation function can sufficiently approximate the range profile obtained by the cross-correlation processing of the above-mentioned Expression (15). Accordingly, in the following description, the circular cross-correlation function obtained by the pulse-by-pulse range compression unit 35 illustrated in FIG. 4 is also referred to as "range profile".

Note that, from Expression (18), the expected value $E\{x_n(\tau)\}$ of the range profile $x_n(\tau)$ has a peak in the time delay difference $\tau=\tau_n$ of the target 2 ($|R_a(0)| \geq |R_a(\tau)|, \forall \tau$). Further, the value of the complex amplitude at the peak is expressed by the following Expression (20).

[Math. 20]

$$\begin{aligned} E\{x_n(\tau_n)\} &= A(\tau_n)R_a(0)\exp\{-j2\pi(f_c - \Delta f_c)\tau_n\} \quad (20) \\ &\approx \alpha(T_0 - \tau_n)R_a(0)\exp\{-j2\pi(f_c - \Delta f_c)\tau_n\} \end{aligned}$$

From Expression (20), it is understood that (the expected value of) a phase at the peak of the n-th range profile is expressed by $2\pi(f_c - \Delta f_c)\tau_n$.

Next, the clutter suppression unit 36 executes processing for subtracting a pulse-direction average of the range profile $x_n(\tau)$ (n=0, 1, ..., HN-1) of each pulse from each range profile, to thereby suppress a reflected signal (clutter) from the stationary object in the background. Note that, the processing of the clutter suppression unit 36 is formulated as the following Expression (21). The clutter suppression unit 36 outputs a signal $x_n(\tau)$ (breve) calculated by Expression (21).

[Math. 21]

$$\breve{x}_n(\tau) = x_n(\tau) - \frac{1}{HN} \sum_{n=0}^{HN-1} x_n(\tau) \quad (21)$$

$$(n = 0, 1, \ldots, HN - 1)$$

Here, with regard to the signal of a reflected wave from the stationary object, the time delay difference does not change on a pulse-by-pulse basis. In other words, the signal of the reflected wave from the stationary object is not subject to the Doppler frequency shift. This can be confirmed also by the above-mentioned Expression (19), in which, if the target 2 is fixed, $\tau = \tau_n$ is constant, and hence the phase of the signal is constant irrespective of a pulse number n.

In Expression (21), the clutter suppression unit 36 averages the range profiles of N pulses to extract a signal having a Doppler frequency of zero, and subtracts this signal from each of the range profiles, to thereby suppress the signal having the Doppler frequency of zero. This can suppress the reflected signal from the stationary object in the background. Note that, the clutter suppression unit 36 is not an essential component to the first embodiment of the present invention. Even if the processing of the clutter suppression unit 36 is omitted, the other components can execute the same processing.

Subsequently, the block-by-block Doppler processing unit 37 calculates a Doppler frequency spectrum (first Doppler frequency spectrum) by executing pulse-direction discrete Fourier transform in units of blocks. In the following description, the range profiles of all the pulses and all the blocks that are obtained as a result of range compression processing performed by the pulse-by-pulse range compression unit 35 are expressed as the following Expression (22). The pulse number has been so far designated by numbers consecutive across all the blocks, but is now initialized for each of the blocks. This is merely for convenience of description, and a substance of the signal is the same.

[Math. 22]

$$\breve{x}_{n,h}(\tau)(n=0,1,\ldots,N-1; h=0,1,\ldots,H-1) \quad (22)$$

The block-by-block Doppler processing unit 37 calculates the Doppler frequency spectrum by executing the pulse-direction discrete Fourier transform on a range-by-range basis as expressed by the following Expression (23) in each block.

[Math. 23]

$$y_h(\tau, f_{dm}) = \sum_{n=0}^{N-1} \breve{x}_{n,h}(\tau) \exp\{-j2\pi n f_{dm} T_0\} \quad (23)$$

In Expression (23), m represents a Doppler frequency cell number, satisfying m=0, 1, ..., M−1. Note that, M=N is satisfied when Expression (22) is implemented by the FFT, and M>N may be satisfied by providing finer steps by zero padding interpolation. The block-by-block Doppler processing unit 37 outputs a signal $y_h(\tau, f_{dm})$.

It is assumed here that a moving distance of the target 2 during the block width $T_b$ is equal to or smaller than a range resolution, in other words, the following Expression (24) is established.

[Math. 24]

$$\frac{f_{dmax}}{f_c} T_b \leq \frac{1}{B} \quad (24)$$

That is, when the condition of Expression (24) is satisfied, the Doppler frequency spectrum of the target 2 can be calculated by executing the pulse-direction discrete Fourier transform on a range-by-range basis as expressed in the above-mentioned Expression (23). Note that, in Expression (24), $f_{dmax}$ represents a value determined by the PRI, satisfying $f_{dmax} = 1/2T_0$. Accordingly, the above-mentioned Expression (24) can be simplified as the following Expression (25).

[Math. 25]

$$\frac{1}{2T_0 f_c} T_b \leq \frac{1}{B} \Leftrightarrow \frac{1}{2T_0 f_c} NT_0 \leq \frac{1}{B} \Leftrightarrow N \leq \frac{2f_c}{B} \quad (25)$$

In other words, it is understood that the condition of the above-mentioned Expression (24) is satisfied when the number N of pulses per block satisfies the relationship of Expression (25).

Here, by assuming the case where the target 2 is formed of one scattering point, a detailed description is made of the output of Doppler processing expressed by the above-mentioned Expression (23). First, a consideration is given to a case where the Doppler frequency of the target 2 is constant during the observing time T and the following Expression (26) is established.

[Math. 26]

$$f_{dn} = f_d \quad (26)$$

In the case where Expression (26) is established, with regard to the signal from the target 2, the time delay difference $t_{n,h}$ in the n-th pulse of an h-th block is expressed by a linear expression of the following Expression (27).

[Math. 27]

$$\tau_{n,h} = \tau_0 - \frac{f_d}{f_c}(hT_b + nT_0) = \tau_{hN} - \frac{f_d}{f_c} nT_0, \quad (27)$$

$$(n = 0, 1, \ldots, N-1; h = 0, 1, \ldots, H-1)$$

Accordingly, an expected value being a result of the pulse-direction discrete Fourier transform in a range bin in which the target signal exists is expressed by the following Expression (28). Note that, it is assumed that the signal does not move across the range bin in each block and that the range bin in which the target 2 exists can be represented by a position $\tau_{hN} = \tau_0 - f_d/f_c \cdot hT_b$ of the pulse at the head of each block.

[Math. 28]

$$E\{y_h(\tau_{hN}, f_{dm})\} = \sum_{n=0}^{N-1} E\{x_n(\tau_{n,h})\}\exp\{-j2\pi n f_{dm}T_0\} \quad (28)$$

$$\approx \sum_{n=0}^{N-1} \alpha(T_0 - \tau_{n,h})R_a(0)\exp\{-j2\pi(f_c - \Delta f_c)\tau_{n,h}\}$$

$$\exp\{-j2\pi n f_{dm}T_0\}$$

$$\approx \alpha(T_0 - \tau_{hN})R_a(0)\exp\{-j2\pi(f_c - \Delta f_c)\tau_{hN}\} \times$$

$$\sum_{n=0}^{N-1} \exp\left\{-j2\pi n\left(f_{dm} - \frac{f_c - \Delta f_c}{f_c}f_d\right)T_0\right\}$$

$$= C_h \cdot \frac{\sin\left\{\pi N\left(f_{dm} - \frac{f_c - \Delta f_c}{f_c}f_d\right)T_0\right\}}{\sin\left\{\pi\left(f_{dm} - \frac{f_c - \Delta f_c}{f_c}f_d\right)T_0\right\}}$$

In Expression (28), by assuming that a target amplitude does not change during the block width $T_b$, an approximation is established as $\alpha(T_0-\tau_{n,h}) \approx \alpha(T_0-\tau_{hN})$. Further, from Expression (28), it is understood that a peak occurs in a Doppler frequency cell satisfying the following Expression (29) in the Doppler frequency spectrum $y_h(\tau_{hN}, f_{dm})$.

[Math. 29]

$$f_{dm} = \frac{f_c - \Delta f_c}{f_c}f_d \quad (29)$$

Note that, in the above-mentioned Expression (28), $C_h$ represents the complex amplitude at the peak observed in the h-th block, and is expressed by the following Expression (30).

[Math. 30]

$$C_h = \alpha(T_0 - \tau_{hN})R_a(0)\exp\{-j2\pi(f_c - \Delta f_c)\tau_{hN}\} \quad (30)$$

$$\exp\left\{-j\pi(N-1)\left(f_{dm} - \frac{f_c - \Delta f_c}{f_c}f_d\right)T_0\right\}$$

Figure 5A:
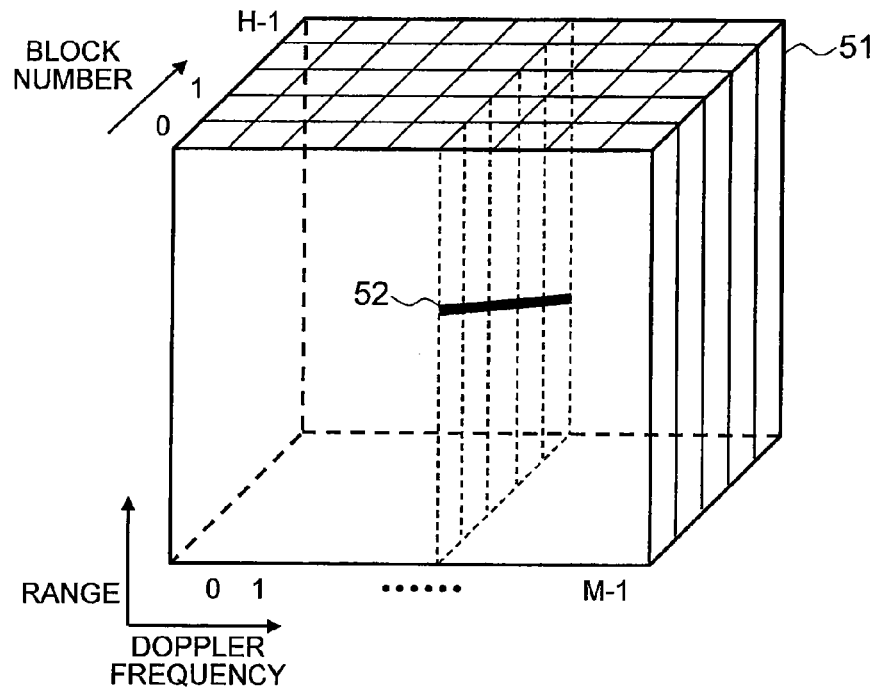
FIGS. 5A and 5B are explanatory diagrams illustrating processing performed by a Doppler frequency cell-associated range migration compensation unit of the passive radar device according to the first embodiment of the present invention.
Figure 5B:
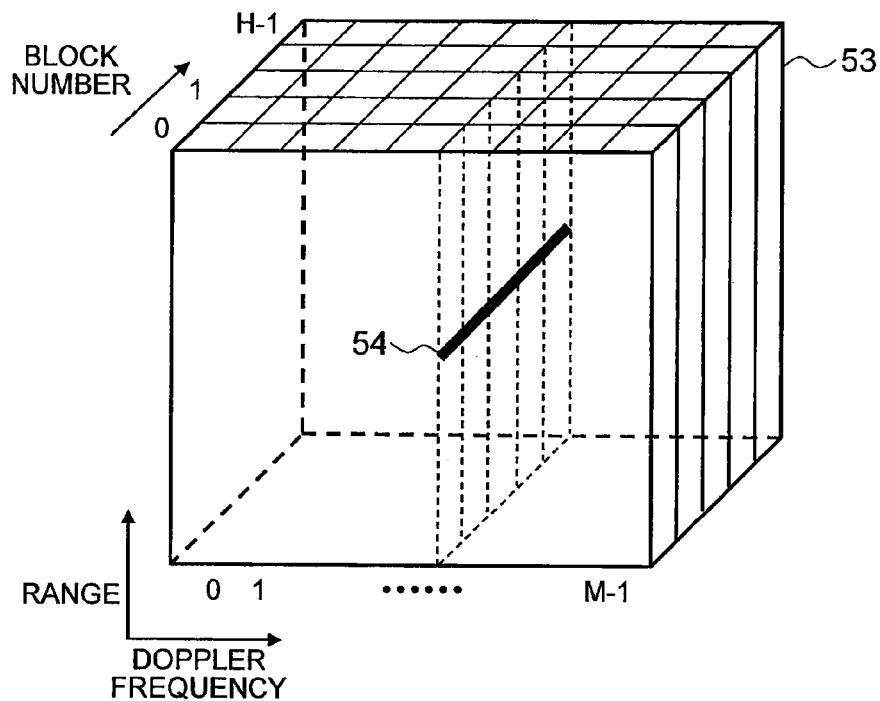

Next, with reference to FIG. 5, a description is made of details of processing performed by the Doppler frequency cell-associated range migration compensation unit 38. FIGS. 5A and 5B are explanatory diagrams illustrating the processing performed by the Doppler frequency cell-associated range migration compensation unit 38 of the passive radar device according to the first embodiment of the present invention.

FIG. 5A illustrates an output signal 51 from the block-by-block Doppler processing unit 37, indicating a signal after pulse-by-pulse range compression processing and block-by-block Doppler processing and before Doppler frequency cell-associated range migration compensation processing. Further, FIG. 5B illustrates an output signal 53 from the Doppler frequency cell-associated range migration compensation unit 38, indicating a signal after the pulse-by-pulse range compression processing, the block-by-block Doppler processing, and the Doppler frequency cell-associated range migration compensation processing.

Further, FIGS. 5A and 5B illustrate a case of receiving the scattered-wave signal from a moving point target as an example, and point target signals 52 and 54 each express the scattered-wave signal received from the moving point target. In other words, in the output signal 51 from the block-by-block Doppler processing unit 37, the point target signal 52 is compressed in a range (corresponding to propagation delay distance difference) direction and a Doppler frequency direction in each block, and is observed as a point image on a range-Doppler map defined on a block-by-block basis. Note that, here, a two-dimensional data array extending in the range direction and the Doppler frequency direction corresponding to a given block number is defined as the range-Doppler map.

Particularly in a case where the Doppler frequency is a constant point target, from the above-mentioned Expression (28), a peak position of the point image is $\tau_{hN}$ in the range direction and $f_{d'}(f_c-\Delta f_c)/f_c$ in the Doppler frequency direction. In FIG. 5A, the peak position of the point image is indicated by the bold line of the point target signal 52. The point target signal 52 indicates that the position in the Doppler frequency direction of the point image does not change on a block-by-block basis, while the position in the range direction changes on a block-by-block basis.

In order to execute block-direction processing, the Doppler frequency cell-associated range migration compensation unit 38 first compensates the movement (migration) of the point image in the range direction. At this time, the Doppler frequency of the signal included in the m-th Doppler frequency cell is $f_{dm}$, and hence a time delay $\tau_{m,h}$ in the h-th block makes a linear temporal change so as to correspond to the Doppler frequency, and is expressed by the following Expression (31).

[Math. 31]

$$\tau_{m,h} = \tau_{m,0} - \frac{f_{dm}}{f_c}hT_b, \quad (31)$$

$$(m = 0, 1, \ldots, M-1; h = 0, 1, \ldots, H-1)$$

Accordingly, with respect to the signal $y_h(\tau, f_{dm})$, by compensating a range-direction movement amount expressed by the second term of Expression (31), the ranges of the signal can be made to coincide with one another. The signal obtained by thus compensating the range-direction movement amount is referred to as "$y_h(\tau, f_{dm})$ (breve)" below. The Doppler frequency cell-associated range migration compensation unit 38 outputs the signal $y_h(\tau, f_{dm})$ (breve) obtained by compensating the range-direction movement amount. The output signal 53 of FIG. 5B indicates a concept diagram of the signal $y_h(\tau, f_{dm})$ (breve).

The Doppler frequency cell-associated range migration compensation unit 38 executes processing for moving the signal $y_h(\tau, f_{dm})$ output by the block-by-block Doppler processing unit 37 by the range-direction movement amount expressed by the above-mentioned Expression (31), to thereby align the ranges of the signal received from a moving target across the blocks as in the output signal 53 of FIG. 5B.

Note that, the Doppler frequency cell-associated range migration compensation unit 38 can perform the processing by a method of shifting the signal $y_h(\tau, f_{dm})$ itself, which is output by the block-by-block Doppler processing unit 37, in the range direction by the range-direction movement amount expressed by the above-mentioned Expression (31), but can realize higher-speed processing by processing based on a shift rule of Fourier transform described below.

Figure 6:
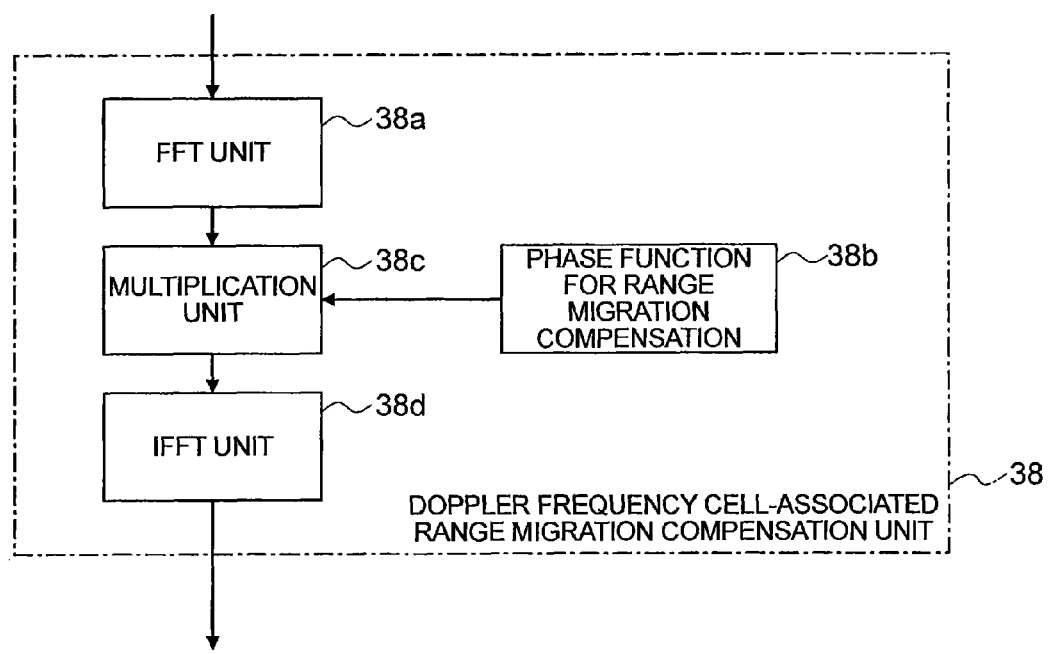
FIG. 6 is a block diagram illustrating the Doppler frequency cell-associated range migration compensation unit of the passive radar device according to the first embodiment of the present invention.

FIG. 6 is a block diagram illustrating the Doppler frequency cell-associated range migration compensation unit 38 in a case where range migration compensation processing based on the shift rule of the Fourier transform is executed in the passive radar device according to the first embodiment of the present invention. In FIG. 6, the Doppler frequency cell-associated range migration compensation unit 38 includes an FFT unit 38a, a phase function 38b for range migration compensation, a multiplication unit 38c, and an IFFT unit 38d.

First, with respect to the signal $y_h(\tau, f_{dm})$ output by the block-by-block Doppler processing unit 37, the FFT unit 38a executes Fourier transform processing expressed by the following Expression (32) by the FFT to perform Fourier-transform in the range direction.

[Math. 32]

$$Y_h(f, f_{dm}) = \mathcal{F}\{y_h(\tau, f_{dm})\}, (m=0,1,\ldots,M-1; h=0,1,\ldots,H-1) \quad (32)$$

In Expression (32), $F\{g\}$ represents the Fourier transform of a function g. Further, the phase function 38b for range migration compensation is a phase function for compensating a phase change corresponding to a block-direction range migration amount corresponding to each of the Doppler frequency cells in the signal $y_h(\tau, f_{dm})$ output by the block-by-block Doppler processing unit 37, and is expressed by the following Expression.

[Math. 33]

$$\exp\left\{-j2\pi f \cdot \frac{f_{dm}}{f_c} hT_d\right\}$$

Subsequently, the multiplication unit 38c uses the calculation expressed by the following Expression (33) to multiply an output $Y_h(f, f_{dm})$ of the Fourier transform of the above-mentioned Expression (32) by the phase function corresponding to the range-direction movement amount.

[Math. 34]

$$\breve{Y}_h(f, f_{dm}) = Y_h(f, f_{dm}) \times \exp\left\{-j2\pi f \cdot \frac{f_{dm}}{f_c} hT_b\right\}, \quad (33)$$
$$(m = 0, 1, \ldots, M-1; h = 0, 1, \ldots, H-1)$$

Next, the IFFT unit 38d executes inverse Fourier transform processing by the IFFT on a signal $\breve{Y}_h(f, f_{dm})$ (breve) obtained as a result of Expression (33) as expressed by the following Expression (34), to thereby obtain the signal $y_h(\tau, f_{dm})$ (breve) in which the range-direction movement amount expressed by the above-mentioned Expression (31) is compensated.

[Math. 35]

$$\breve{y}_h(\tau, f_{dm}) = \mathcal{F}^{-1}\{\breve{Y}_h(f, f_{dm})\}, (m=0,1,\ldots,M-1; h=0,1,\ldots,H-1) \quad (34)$$

Subsequently, a description is made of details of processing performed by the block-direction Doppler processing unit 39. In the signal $y_h(\tau, f_{dm})$ (breve) obtained by compensating the range-direction movement amount, the signal received from the target 2 whose Doppler frequency is constant is aligned in a block direction as indicated by the bold lines in FIG. 3. Therefore, the block-direction Doppler processing unit 39 calculates a Doppler frequency spectrum (second Doppler frequency spectrum) by executing block-direction discrete Fourier transform on the signal $y_h(\tau, f_{dm})$ (breve) for each range-Doppler cell as expressed by the following Expression (35).

[Math. 36]

$$z(\tau, f_{dm}, d_{dl}) = \sum_{h=0}^{H-1} \breve{y}_h(\tau, f_{dm})\exp\{-j2\pi h f_{dl} T_b\} \quad (35)$$

In Expression (35), l represents a Doppler frequency cell number, satisfying l=0, 1, ..., L−1. Note that, in the same manner as in the case of the above-mentioned Expression (22), L=H is satisfied when the above-mentioned Expression (29) implemented by the FFT, and L>H may be satisfied by providing finer steps by zero padding interpolation. The block-direction Doppler processing unit 39 outputs a signal $z(\tau, f_{dm}, f_{dl})$ calculated by Expression (35).

Further, an expected value being a result of the block-direction discrete Fourier transform in the range-Doppler cell in which the target signal exists is expressed by the following Expression (36).

[Math. 37]

$$E\left\{z\left(\tau_{hN}, \frac{f_c - \Delta f_c}{f_c} f_d, f_{dl}\right)\right\} = \sum_{h=0}^{H-1} E\left\{\breve{y}_h\left(\tau_{hN}, \frac{f_c - \Delta f_c}{f_c} f_d\right)\right\} \quad (36)$$
$$\exp\{-j2\pi h f_{dl} T_b\}$$
$$= \sum_{h=0}^{H-1} C_h \exp\{-j2\pi h f_{dl} T_b\}$$
$$\approx \alpha(T_0 - \tau_0) R_a(0)$$
$$\exp\left\{-j\pi(N-1)\left(f_{dm} - \frac{f_c - \Delta f_c}{f_c} f_d\right) T_0\right\} \times$$
$$\exp\{-j2\pi(f_c - \Delta f_c)\tau_0\}$$
$$\sum_{h=0}^{H-1} \exp\left\{-j2\pi h\left(f_{dl} - \frac{f_c - \Delta f_c}{f_c} f_d\right) T_b\right\}$$
$$= D \cdot \frac{\sin\left\{\pi H\left(f_{dl} - \frac{f_c - \Delta f_c}{f_c} f_d\right) T_b\right\}}{\sin\left\{\pi\left(f_{dl} - \frac{f_c - \Delta f_c}{f_c} f_d\right) T_b\right\}}$$

In Expression (36), by assuming that the target amplitude does not change during the observing time T, an approximation is established as $\alpha(T_0 - \tau_{hN}) \approx \alpha(T_0 - \tau_0)$. Further, from Expression (36), it is understood as a result of block-direction Fourier transform that a peak occurs in the Doppler frequency cell satisfying the following Expression (37).

[Math. 38]

$$f_{dl} = \frac{f_c - \Delta f_c}{f_c} f_d \quad (37)$$

Note that, in the above-mentioned Expression (36), D represents the complex amplitude at the peak, and is expressed by the following Expression (38).

[Math. 39]

$$D = \alpha(T_0 - \tau_0)R_a(0)\exp\{-j2\pi(f_c - \Delta f_c)\tau_0\} \times$$
$$\exp\left\{-j\pi(N-1)\left(f_{dm} - \frac{f_c - \Delta f_c}{f_c}f_d\right)T_0\right\}$$
$$\exp\left\{-j\pi(N-1)\left(f_{dl} - \frac{f_c - \Delta f_c}{f_c}f_d\right)T_b\right\} \quad (38)$$

As a result of this processing, both the pulse direction and the block direction are converted into dimensions of the Doppler frequency. Accordingly, the signal $z(\tau, f_{dm}, f_{dl})$ can be easily converted into one range-Doppler map by being appropriately rearranged.

In order to execute the processing described above in the first embodiment of the present invention, it is necessary to first determine the pulse width $T_0$ and the block width $T_b$, but those parameters can be determined by the following procedure. It should be noted that the observing time T is given as a result of feasibility study and is not a parameter that accompanies a system according to the first embodiment of the present invention.

First, with regard to the determination of the pulse width $T_0$, from the geometry of observation and the condition of the assumed target 2, an upper limit of an absolute value of the Doppler frequency that can be observed is set to $f_{dmax}$. At this time, the pulse width $T_0$ can be determined based on the following Expression (39).

[Math. 40]

$$T_0 > \frac{1}{2f_{dmax}} \quad (39)$$

Subsequently, with regard to the determination of the block width $T_b$, an upper limit of the number N of pulses within the block is given by the above-mentioned Expression (25). Accordingly, after the pulse width $T_0$ is determined so as to satisfy the condition expressed by Expression (39), the block width $T_b$ may be determined so as to satisfy a relationship expressed by the following Expression (40).

[Math. 41]

$$T_b = NT_0 \text{ in this regard } N \leq \frac{2f_c}{B} \quad (40)$$

Next, with respect to the signal $z(\tau, f_{dm}, f_{dl})$ calculated by the above-mentioned Expression (35) or the signal obtained by converting the signal $z(\tau, f_{dm}, f_{dl})$ into one range-Doppler map by being appropriately rearranged, the target detection unit 40 calculates an intensity $P(\tau, f_{dm}, f_{dl})$ thereof by the following Expression (41).

[Math. 42]

$$P(\tau, f_{dm}, f_{dl}) = |z(\tau, f_{dm}, f_{dl})|^2 \quad (41)$$

Subsequently, the target detection unit 40 detects the target signal by applying detection processing such as a constant false alarm rate (CFAR) processing to an intensity signal $P(\tau, f_{dm}, f_{dl})$. Here, a widely-known technology may be used for the CFAR processing.

Note that, before the CFAR processing, the intensity signal $P(\tau, f_{dm}, f_{dl})$ may be incoherently integrated across a plurality of cells adjacent to each other in terms of the range direction, the Doppler frequency direction, or both thereof. Through this processing, a standard deviation of noise components can be reduced, and signal components can be incoherently integrated in a case where the target signal extends toward the range direction, the Doppler frequency direction, or both thereof, which can improve the SNR.

As described above, the passive radar device according to the first embodiment includes: the pulse-by-pulse range compression unit for executing the cross-correlation processing between the received signal of the direct wave and the received signal of the scattered wave on each of the pulses divided by the direct-wave reception unit and the scattered-wave reception unit and calculating a pulse-by-pulse range profile; the block-by-block Doppler processing unit for calculating the first Doppler frequency spectrum by executing pulse-direction Fourier transform in units of blocks each of which groups a plurality of pulses; the Doppler frequency cell-associated range migration compensation unit for compensating a range-direction movement amount with respect to the first Doppler frequency spectrum on a Doppler-frequency-cell-by-Doppler-frequency-cell basis and on a block-by-block basis; and the block-direction Doppler processing unit for calculating the second Doppler frequency spectrum by executing the block-direction Fourier transform on the output from the Doppler frequency cell-associated range migration compensation unit.

In other words, the processing is executed by dividing the received signal in units of pulses and blocks, and the range migration compensation processing is executed on a Doppler-frequency-cell-by-Doppler-frequency-cell basis before the block-direction processing is executed, which allows integration over a long period to be performed on the signal received from the moving target. Further, each processing is executed only by multiplication between the FFT and a complex number, which can greatly reduce a calculation amount.

Accordingly, it is possible to obtain the passive radar device capable of extending the observing time for the target and an integration time of a signal with a small calculation amount, sufficiently improving the SNR, and stretching a detection range.

Second Embodiment

Figure 7:
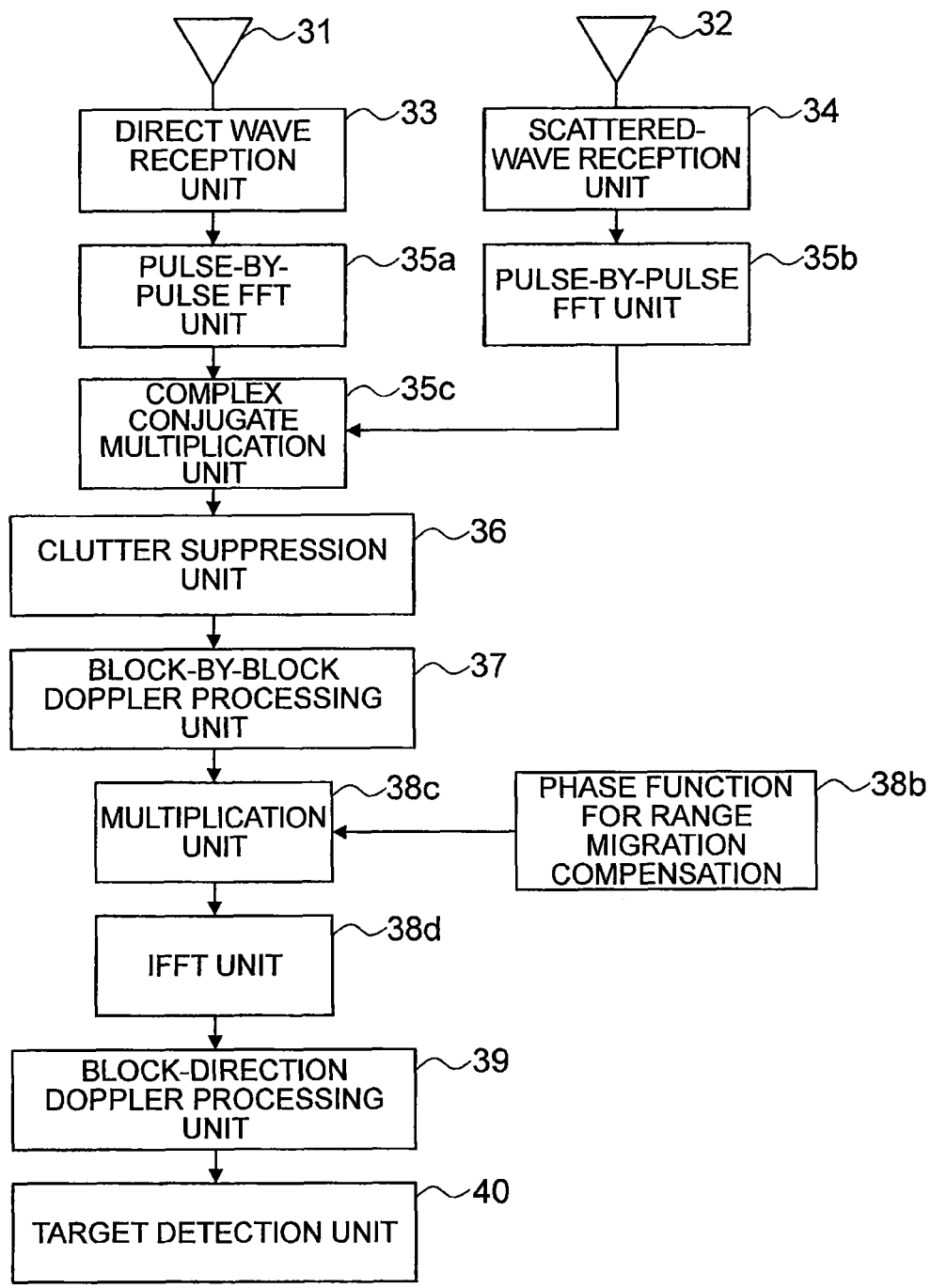
FIG. 7 is a block diagram illustrating a passive radar device according to a second embodiment of the present invention.

FIG. 7 is a block diagram illustrating a passive radar device according to a second embodiment of the present invention. In FIG. 7, the passive radar device includes the antenna 31 for direct-wave reception, the antenna 32 for scattered-wave reception, the direct-wave reception unit 33, the scattered-wave reception unit 34, the pulse-by-pulse FFT unit 35a, the pulse-by-pulse FFT unit 35b, the complex conjugate multiplication unit 35c, the clutter suppression unit 36, the block-by-block Doppler processing unit 37, the phase function 38b for range migration compensation, the multiplication unit 38c, the IFFT unit 38d, the block-direction Doppler processing unit 39, and the target detection unit 40.

Here, the pulse-by-pulse FFT unit 35a, the pulse-by-pulse FFT unit 35b, and the complex conjugate multiplication unit 35c, and the phase function 38b for range migration compensation, the multiplication unit 38c, and the IFFT unit 38d are the same as those illustrated in FIGS. 4 and 6, respectively.

When the components illustrated in FIGS. 4 and 6 are inserted into the pulse-by-pulse range compression unit 35 and the Doppler frequency cell-associated range migration compensation unit 38 illustrated in FIG. 2, respectively, the clutter suppression unit 36 and the block-by-block Doppler processing unit 37 are sandwiched by the pulse-by-pulse IFFT unit 35d and the FFT unit 38a.

The clutter suppression unit 36 and the block-by-block Doppler processing unit 37 are both processing that is constant in the range direction, and hence, when the components illustrated in FIGS. 4 and 6 are inserted into the components illustrated in FIG. 2, respectively, there occurs processing for again performing Fourier-transform on what is temporarily inverse-Fourier-transformed in the range direction without adding any range-direction processing, which causes the calculation amount to increase.

Therefore, in the second embodiment of the present invention, the pulse-by-pulse IFFT unit 35d and the FFT unit 38a are omitted. With such a configuration, it is possible to prevent the calculation amount from increasing and to speed up the processing.

As described above, according to the second embodiment: the pulse-by-pulse range compression unit includes: the pulse-by-pulse FFT unit for dividing the received signal of the direct wave and the received signal of the scattered wave into pulses, and Fourier-transforming each thereof; and the complex conjugate multiplication unit for multiplying the complex conjugate signal of the received signal of the direct wave which is Fourier-transformed by the pulse-by-pulse FFT unit by the received signal of the scattered wave which is Fourier-transformed by the pulse-by-pulse FFT unit; and the Doppler frequency cell-associated range migration compensation unit includes: the multiplication unit for multiplying the first Doppler frequency spectrum by a phase function for range migration compensation for compensating a phase change corresponding to the block-direction range migration amount corresponding to each of the Doppler frequency cells in the first Doppler frequency spectrum; and the IFFT unit for executing the inverse Fourier transform on the output from the multiplication unit.

In this manner, by omitting the pulse-by-pulse IFFT unit and the FFT unit illustrated in FIGS. 4 and 6, respectively, it is possible to reduce the calculation amount and to speed up the processing.

Third Embodiment

Figure 8:
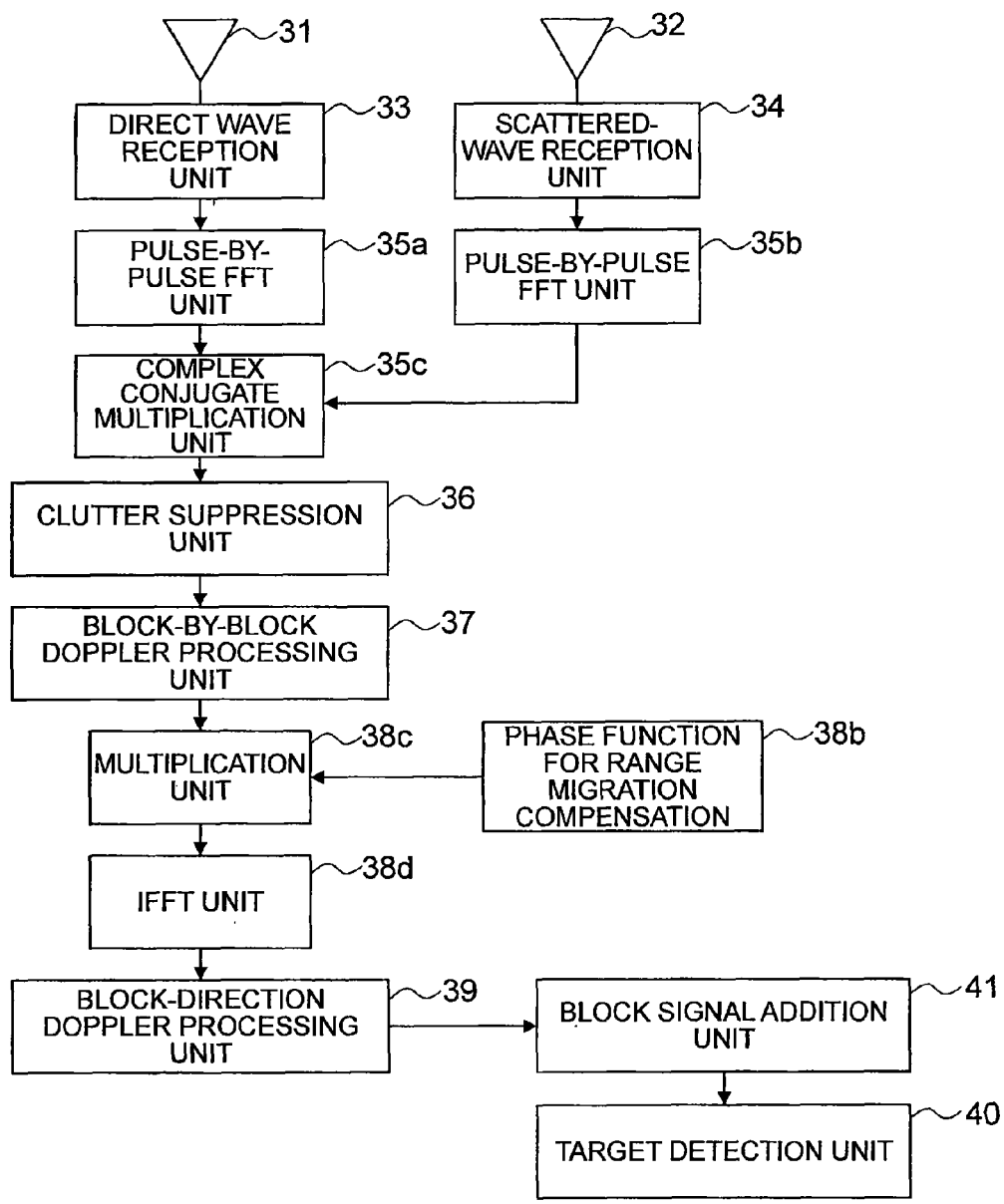
FIG. 8 is a block diagram illustrating a passive radar device according to a third embodiment of the present invention.

FIG. 8 is a block diagram illustrating a passive radar device according to a third embodiment of the present invention. In FIG. 8, the passive radar device further includes a block signal addition unit 41 in addition to the components of the passive radar device illustrated in FIG. 7. The other components are the same as those of the second embodiment described above, and hence descriptions thereof are omitted.

Figure 9:
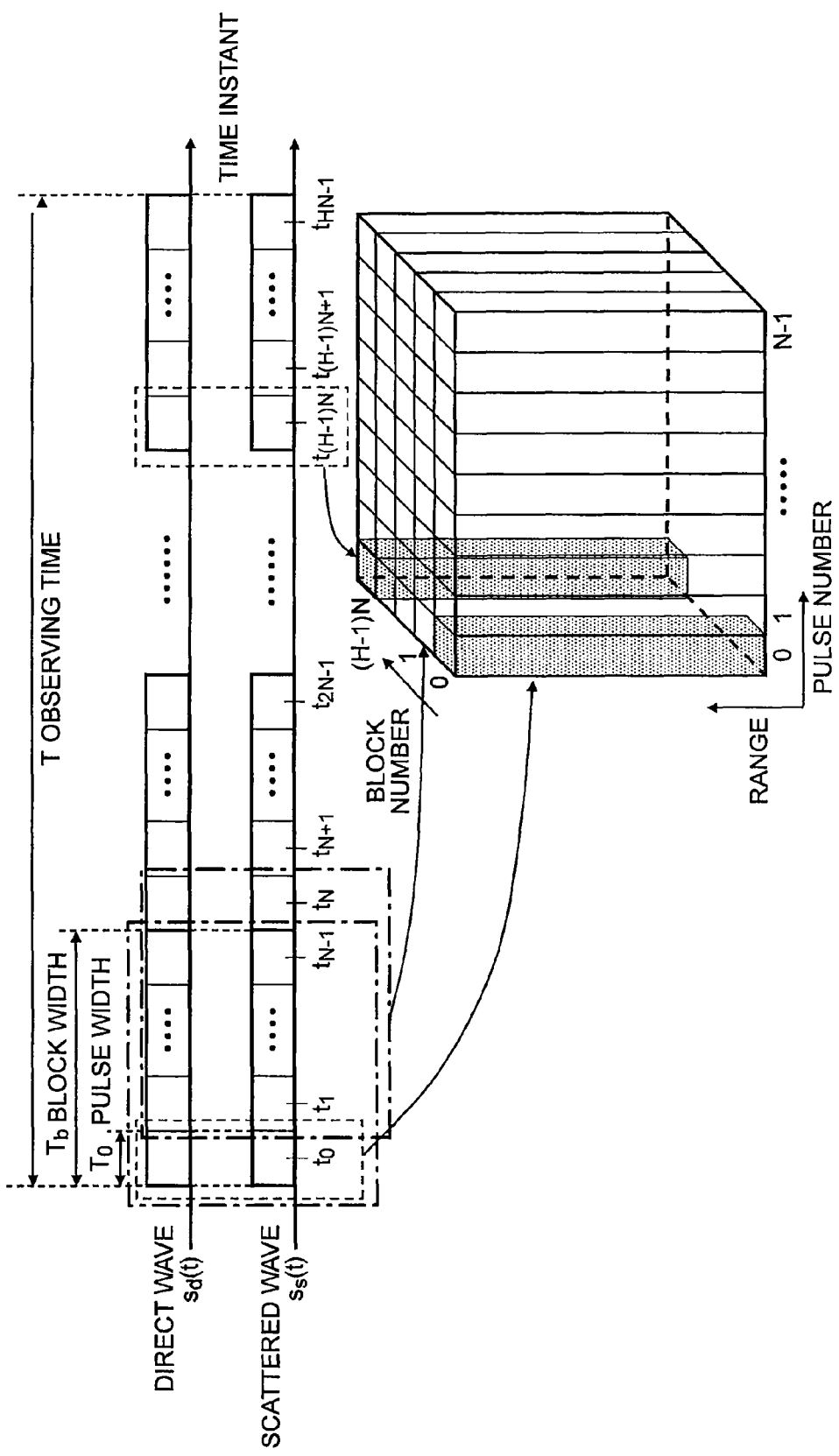
FIG. 9 is an explanatory diagram illustrating handling of a received signal in processing performed by the passive radar device according to the third embodiment of the present invention.

FIG. 9 is an explanatory diagram illustrating handling of a received signal in processing performed by the passive radar device according to the third embodiment of the present invention. FIG. 9 is substantially the same as FIG. 3, and hence a description is made of only different points from FIG. 3.

In FIG. 3, the blocks are set so that the adjacent blocks do not overlap each other, while in FIG. 9, the adjacent blocks overlap each other. For example, in FIG. 3, the pulses forming the second block have the pulse numbers of N to 2N−1, while in FIG. 9, the pulses forming the second block have the pulse numbers of 1 to N. Further, the number of blocks is H in the case where the blocks are set so as not to overlap each other as in FIG. 3, while in the case where the blocks are set as in FIG. 9, the number of set blocks is (H−1)N.

Note that, in FIG. 9, the adjacent blocks are set so as to be shifted by one pulse, but the present invention is not limited thereto, and more generally, the adjacent blocks may be set so as to be shifted by a plurality of pulses.

Figure 10:
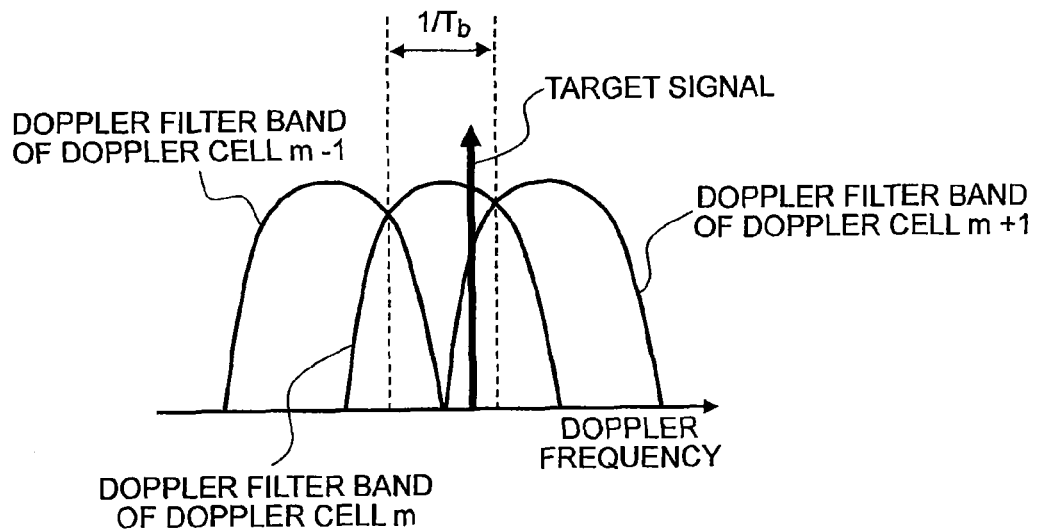
FIG. 10 is an explanatory diagram illustrating properties of a signal handled in the processing performed by the passive radar device according to the third embodiment of the present invention.
Figure 11:
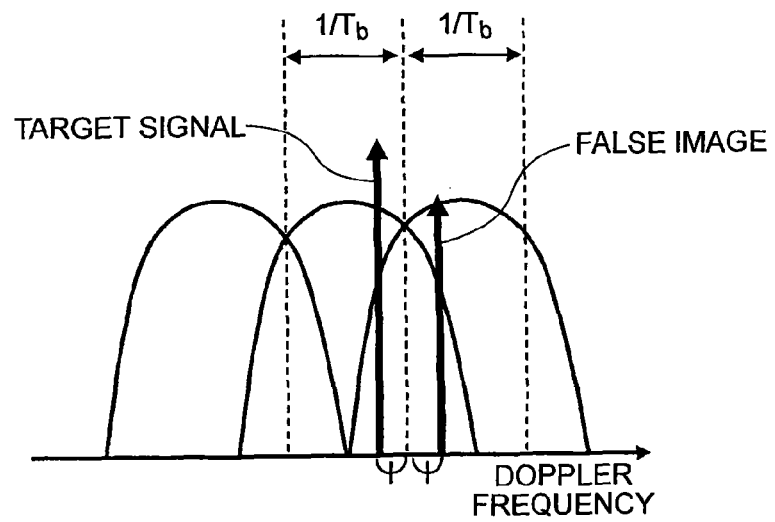
FIG. 11 is an explanatory diagram illustrating properties of the signal handled in the processing performed by the passive radar device according to the third embodiment of the present invention.
Figure 12:
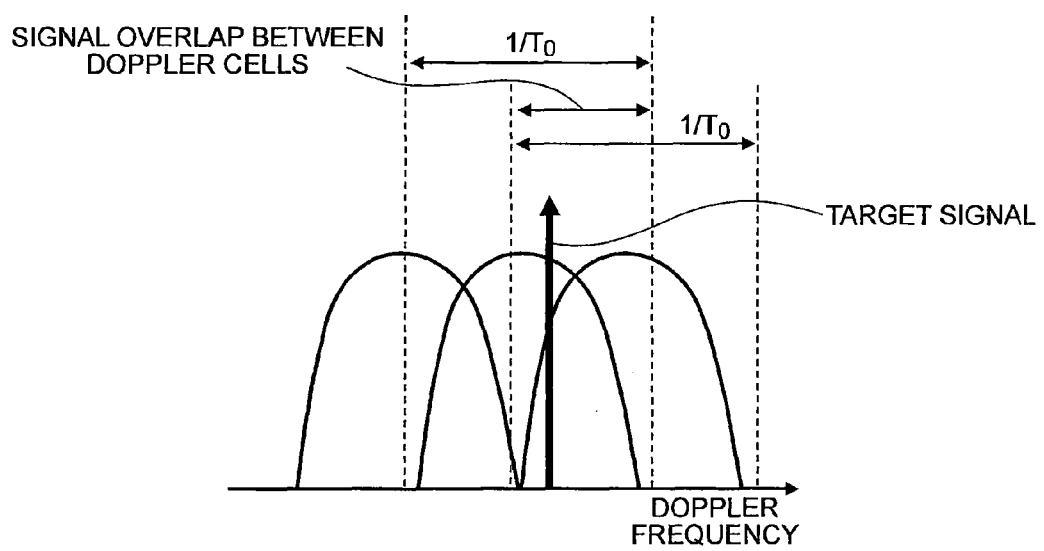
FIG. 12 is an explanatory diagram illustrating properties of the signal handled in the processing performed by the passive radar device according to the third embodiment of the present invention.

FIGS. 10 to 12 are explanatory diagrams illustrating properties of a signal handled in the processing performed by the passive radar device according to the third embodiment of the present invention.

FIG. 10 is a schematic diagram illustrating Doppler filter bands obtained as a result of the Doppler processing performed by the block-by-block Doppler processing unit 37. In FIG. 10, it is assumed that the target signal is included in the Doppler filter band of a Doppler cell m. Further, FIG. 10 also illustrates the Doppler filter bands of adjacent Doppler cells.

Further, a bandwidth $1/T_b$ of the Doppler frequency spectrum in block-direction Doppler processing performed by the block-direction Doppler processing unit 39 according to the first and second embodiments is indicated by being surrounded by the broken lines. In the first and second embodiments, the blocks are set so that the adjacent blocks do not overlap each other, and hence the repetition interval between the blocks coincides with the block width $T_b$. Therefore, the bandwidth of the Doppler frequency spectrum in the block-direction Doppler processing performed by the block-direction Doppler processing unit 39 is $1/T_b$.

FIG. 11 is a schematic diagram illustrating that a false image may occur as a result of the block-direction Doppler processing performed by the block-direction Doppler processing unit 39 when the blocks are set so that the adjacent blocks do not overlap each other. In FIG. 11, the target signal is included in both the Doppler filter band of the Doppler cell m and the Doppler filter band of a Doppler cell m+1 that are obtained as a result of the Doppler processing performed by the block-by-block Doppler processing unit 37.

Accordingly, in the Doppler frequency spectrum obtained as a result of the block-direction Doppler processing performed by the block-direction Doppler processing unit 39 on the target signal of the Doppler cell m+1, the target signal is folded back as illustrated in FIG. 11, and the false image occurs within a range of the Doppler cell m+1.

FIG. 12 is a schematic diagram illustrating that the false image illustrated in FIG. 11 can be suppressed by setting the blocks so that the adjacent blocks overlap each other based on the example illustrated in FIG. 9. In the example illustrated in FIG. 9, the adjacent blocks are set so as to be shifted by one pulse, and hence the repetition interval between the blocks coincides with the pulse width $T_0$. Therefore, the bandwidth of the Doppler frequency spectrum in the block-direction Doppler processing performed by the block-direction Doppler processing unit 39 is $1/T_0$.

As illustrated in FIG. 12, the bandwidth $1/T_0$ of the Doppler frequency spectrum in the block-direction Doppler processing performed by the block-direction Doppler processing unit 39 is sufficiently larger than the bandwidth $1/T_b$ of each Doppler filter obtained as a result of the Doppler processing performed by the block-by-block Doppler processing unit 37, and hence it is understood that the target signal is not folded back unlike the case illustrated in FIG. 11.

Therefore, the block signal addition unit 41 of FIG. 8 converts the block-direction Doppler frequency spectrum, which is calculated for each Doppler cell by the block-direction Doppler processing unit 39, into one range-Doppler map while adding thereto a signal of an overlap of the spectrum.

In the first embodiment, the bandwidth of each Doppler filter obtained as a result of the Doppler processing performed by the block-by-block Doppler processing unit 37 coincides with the bandwidth of the Doppler frequency spectrum in the block-direction Doppler processing performed by the block-direction Doppler processing unit 39, and hence the signal z ($\tau$, $f_{dm}$, $f_{dl}$) can be converted into one range-Doppler map simply by being rearranged.

However, when the blocks are set so that the adjacent blocks overlap each other as in the third embodiment, the bandwidth of the Doppler frequency spectrum in the block-direction Doppler processing performed by the block-direction Doppler processing unit 39 is wider than the bandwidth of each Doppler filter obtained as a result of the Doppler processing performed by the block-by-block Doppler processing unit 37.

Therefore, as illustrated in FIG. 12, Doppler frequency spectrum bands output by the block-direction Doppler processing unit 39 which correspond to the adjacent Doppler cells overlap each other. The block signal addition unit 41 executes processing for coherently adding the signal of the overlap. Note that, the addition may be performed incoherently.

Note that, instead of using the block signal addition unit 41, as illustrated in FIG. 13, a block signal selection unit 42 may be used. The block signal selection unit 42 executes processing for discarding the signal of the overlap instead of executing the above-mentioned processing for coherently adding the signal of the overlap. With this configuration, it is possible to reduce processing load by an amount corresponding to the addition processing that is not executed.

As described above, according to the third embodiment, the block-by-block Doppler processing unit sets the blocks so that the adjacent blocks overlap each other, to thereby set the bandwidth of the Doppler frequency spectrum in the block-direction Doppler processing performed by the block-direction Doppler processing unit wider than the bandwidth of each Doppler filter obtained as a result of the Doppler processing performed by the block-by-block Doppler processing unit.

Accordingly, it is possible to suppress the false image that may occur with the configuration of the first embodiment.

REFERENCE SIGNS LIST 1 broadcasting station, 2 target, 3 receiving station, 31 antenna for direct-wave reception, 32 antenna for scattered-wave reception, 33 direct-wave reception unit, 34 scattered-wave reception unit, 35 pulse-by-pulse range compression unit, 35a, 35b pulse-by-pulse FFT unit, 35c complex conjugate multiplication unit, 35d pulse-by-pulse IFFT unit, 36 clutter suppression unit, 37 block-by-block Doppler processing unit, 38 Doppler frequency cell-associated range migration compensation unit, 38a FFT unit, 38b phase function for range migration compensation, 38c multiplication unit, 38d IFFT unit, 39 block-direction Doppler processing unit, 40 target detection unit, 41 block signal addition unit, 42 block signal selection unit.

The invention claimed is:

1. A passive radar device, comprising:
a direct-wave reception antenna that receives a direct wave that directly arrives at the direct-wave reception antenna after being transmitted from a radio source;
a scattered-wave reception antenna that receives a scattered wave transmitted from the radio source and scattered by a target;
a direct-wave receiver that divides a received signal of the direct wave into pulses;
a scattered-wave receiver that divides a received signal of the scattered wave into pulses;
a pulse-by-pulse range compressor that executes cross-correlation processing between the received signal of the direct wave and the received signal of the scattered wave on each of the divided pulses and that calculates a pulse-by-pulse range profile;
a block-by-block Doppler processor that calculates a first Doppler frequency spectrum by executing pulse-direction Fourier transform in units of blocks each of which groups a plurality of pulses;
a Doppler frequency cell-associated range migration compensator that compensates a range-direction movement amount with respect to the first Doppler frequency spectrum on a Doppler-frequency-cell-by-Doppler-frequency-cell basis and on a block-by-block basis; and
a block-direction Doppler processor that calculates a second Doppler frequency spectrum by executing block-direction Fourier transform on an output from the Doppler frequency cell-associated range migration compensator.

2. A passive radar device according to claim 1, wherein the pulse-by-pulse range compressor comprises:
a pulse-by-pulse FFT that divides the received signal of the direct wave and the received signal of the scattered wave into pulses, and that Fourier-transforms each of the pulses;
a complex conjugate multiplier that multiplies a complex conjugate signal of the received signal of the direct wave which is Fourier-transformed by the pulse-by-pulse FFT by the received signal of the scattered wave which is Fourier-transformed by the pulse-by-pulse FFT; and
a pulse-by-pulse IFFT that executes an inverse Fourier transform on an output from the complex conjugate multiplier.

3. A passive radar device according to claim 1, wherein the Doppler frequency cell-associated range migration compensator comprises:
an FFT that executes a range-direction Fourier transform on the first Doppler frequency spectrum;
a multiplier that multiplies an output from the FFT by a phase function for range migration compensation for compensating a phase change corresponding to a block-direction range migration amount corresponding to each of the Doppler frequency cells in the first Doppler frequency spectrum; and
an IFFT that executes an inverse Fourier transform on an output from the multiplier.

4. A passive radar device according to claim 2, wherein the Doppler frequency cell-associated range migration compensator comprises:
an FFT that executes a range-direction Fourier transform on the first Doppler frequency spectrum;
a multiplier that multiplies an output from the FFT by a phase function for range migration compensation for compensating a phase change corresponding to a block-direction range migration amount corresponding to each of the Doppler frequency cells in the first Doppler frequency spectrum; and
an IFFT that executes an inverse Fourier transform on an output from the multiplier.

5. A passive radar device according to claim 1, wherein:
the pulse-by-pulse range compressor comprises:
a pulse-by-pulse FFT that divides the received signal of the direct wave and the received signal of the scattered wave into pulses, and that Fourier-transforms each of the pulses; and
a complex conjugate multiplier that multiplies a complex conjugate signal of the received signal of the direct wave which is Fourier-transformed by the pulse-by-pulse FFT by the received signal of the scattered wave which is Fourier-transformed by the pulse-by-pulse FFT; and the Doppler frequency cell-associated range migration compensator comprises:
- a multiplier that multiplies the first Doppler frequency spectrum by a phase function for range migration compensation for compensating a phase change corresponding to a block-direction range migration amount corresponding to each of the Doppler frequency cells in the first Doppler frequency spectrum; and
- an IFFT that executes an inverse Fourier transform on an output from the multiplier.

6. A passive radar device according to claim 1, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal adder that coherently or incoherently adds an overlap of a bandwidth of the second Doppler frequency spectrum calculated by the block-direction Doppler processor.

7. A passive radar device according to claim 2, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal adder that coherently or incoherently adds an overlap of a bandwidth of the second Doppler frequency spectrum calculated by the block-direction Doppler processor.

8. A passive radar device according to claim 3, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal adder that coherently or incoherently adds an overlap of a bandwidth of the second Doppler frequency spectrum calculated by the block-direction Doppler processor.

9. A passive radar device according to claim 4, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal adder that coherently or incoherently adds an overlap of a bandwidth of the second Doppler frequency spectrum calculated by the block-direction Doppler processor.

10. A passive radar device according to claim 5, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal adder that coherently or incoherently adds an overlap of a bandwidth of the second Doppler frequency spectrum calculated by the block-direction Doppler processor.

11. A passive radar device according to claim 1, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal selector that discards signals in a bandwidth overlap of the second Doppler frequency spectrum calculated by the block-direction Doppler processor.

12. A passive radar device according to claim 2, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal selector that discards signals in a bandwidth overlap of the second Doppler frequency spectrum calculated by the block-direction Doppler processor.

13. A passive radar device according to claim 3, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal selector that discards signals in a bandwidth overlap of the second Doppler frequency spectrum calculated by the block-direction Doppler processor.

14. A passive radar device according to claim 4, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and the passive radar device further comprises a block signal selector that discards signals in a bandwidth overlap of the second Doppler frequency spectrum calculated by the block-direction Doppler processor.

15. A passive radar device according to claim 5, wherein:
the block-by-block Doppler processor sets the blocks so that adjacent blocks overlap each other to set a bandwidth of a Doppler frequency spectrum in block-direction Doppler processing performed by the block-direction Doppler processor wider than a bandwidth of each Doppler filter obtained as a result of Doppler processing performed by the block-by-block Doppler processor; and
the passive radar device further comprises a block signal selector that discards signals in a bandwidth overlap of the second Doppler frequency spectrum calculated by the block-direction Doppler processor.

* * * * *